US011739394B2

(12) United States Patent
Coletti et al.

(10) Patent No.: US 11,739,394 B2
(45) Date of Patent: *Aug. 29, 2023

(54) COPPER PRODUCTION PROCESS

(71) Applicant: METALLO BELGIUM, Beerse (BE)

(72) Inventors: Bert Coletti, Beerse (BE); Jan Dirk A. Goris, Beerse (BE); Yves De Visscher, Beerse (BE); Charles Geenen, Beerse (BE); Walter Guns, Beerse (BE); Niko Mollen, Beerse (BE); Steven Smets, Beerse (BE); Andy Breugelmans, Beerse (BE)

(73) Assignee: METALLO BELGIUM, Beerse (BE)

( * ) Notice: Subject to any disclaimer, the term of this patent is extended or adjusted under 35 U.S.C. 154(b) by 189 days.

This patent is subject to a terminal disclaimer.

(21) Appl. No.: 16/771,381

(22) PCT Filed: Dec. 11, 2018

(86) PCT No.: PCT/EP2018/084393
§ 371 (c)(1),
(2) Date: Jun. 10, 2020

(87) PCT Pub. No.: WO2019/115543
PCT Pub. Date: Jun. 20, 2019

(65) Prior Publication Data
US 2021/0172039 A1    Jun. 10, 2021

(30) Foreign Application Priority Data

Dec. 14, 2017 (EP) .................................. 17207372

(51) Int. Cl.
| C22B 15/00 | (2006.01) |
| B23K 35/26 | (2006.01) |
| C22B 13/02 | (2006.01) |
| C22B 15/06 | (2006.01) |
| C22B 25/02 | (2006.01) |
| B23K 103/08 | (2006.01) |

(52) U.S. Cl.
CPC .......... *C22B 15/006* (2013.01); *B23K 35/268* (2013.01); *C22B 13/02* (2013.01); *C22B 15/0043* (2013.01); *C22B 25/02* (2013.01); *B23K 2103/08* (2018.08)

(58) Field of Classification Search
CPC ... C22B 15/006; C22B 13/02; C22B 15/0043; C22B 25/02; C22B 15/0054; C22B 5/02; C22B 7/04; C22B 13/025; C22B 15/0056; C22B 25/06; B23K 35/268; B23K 2103/08; B23K 35/302; C22C 9/08; C22C 13/00; C22C 9/00; C22C 9/06; C22C 11/04; Y02P 10/20
USPC ......................................................... 75/640
See application file for complete search history.

(56) References Cited

U.S. PATENT DOCUMENTS

| 4,515,631 | A | 5/1985 | Lindquist et al. | |
| 2017/0198371 | A1 | 7/2017 | Ayhan et al. | |
| 2020/0392604 | A1* | 12/2020 | Coletti | C22C 9/00 |
| 2021/0071282 | A1* | 3/2021 | Coletti | C22B 25/02 |
| 2021/0172040 | A1* | 6/2021 | Coletti | C22B 13/025 |
| 2021/0363606 | A1* | 11/2021 | Coletti | C22B 13/025 |

FOREIGN PATENT DOCUMENTS

| AU | 469773 B2 | 3/1974 |
| EP | 0 185 004 A1 | 6/1986 |
| WO | 2015188799 A1 | 12/2015 |

OTHER PUBLICATIONS

International Search Report dated Jan. 31, 2019, issued in corresponding International Application No. PCT/EP2018/084393, filed Dec. 11, 2018, 4 pages.
Written Opinion of the International Searching Authority dated Jan. 31, 2019, issued in corresponding International Application No. PCT/EP2018/084393, filed Dec. 11, 2018, 8 pages.
International Preliminary Report on Patentability completed Dec. 13, 2019, issued in corresponding International Application No. PCT/EP2018/084393, filed Dec. 11, 2018, 7 pages.

* cited by examiner

Primary Examiner — Brian D Walck
Assistant Examiner — Danielle M. Carda
(74) Attorney, Agent, or Firm — Christensen O'Connor Johnson Kindness PLLC

(57) ABSTRACT

A process for a producing crude solder product and a copper product includes the steps of
providing a black copper comprising >=50% wt of copper together with >=1.0% wt of tin and/or >=1.0% wt of lead, and
refining a first portion of the black copper to obtain a refined copper product together with at least one copper refining slag. The process further includes the steps of
recovering a first crude solder product from the copper refining slag, thereby forming a solder refining slag in equilibrium with the first crude solder product, and
contacting a different portion of the black copper with the solder refining slag thereby forming a spent slag and a lead-tin based metal, followed by separating the spent slag from the lead-tin based metal.

14 Claims, 1 Drawing Sheet

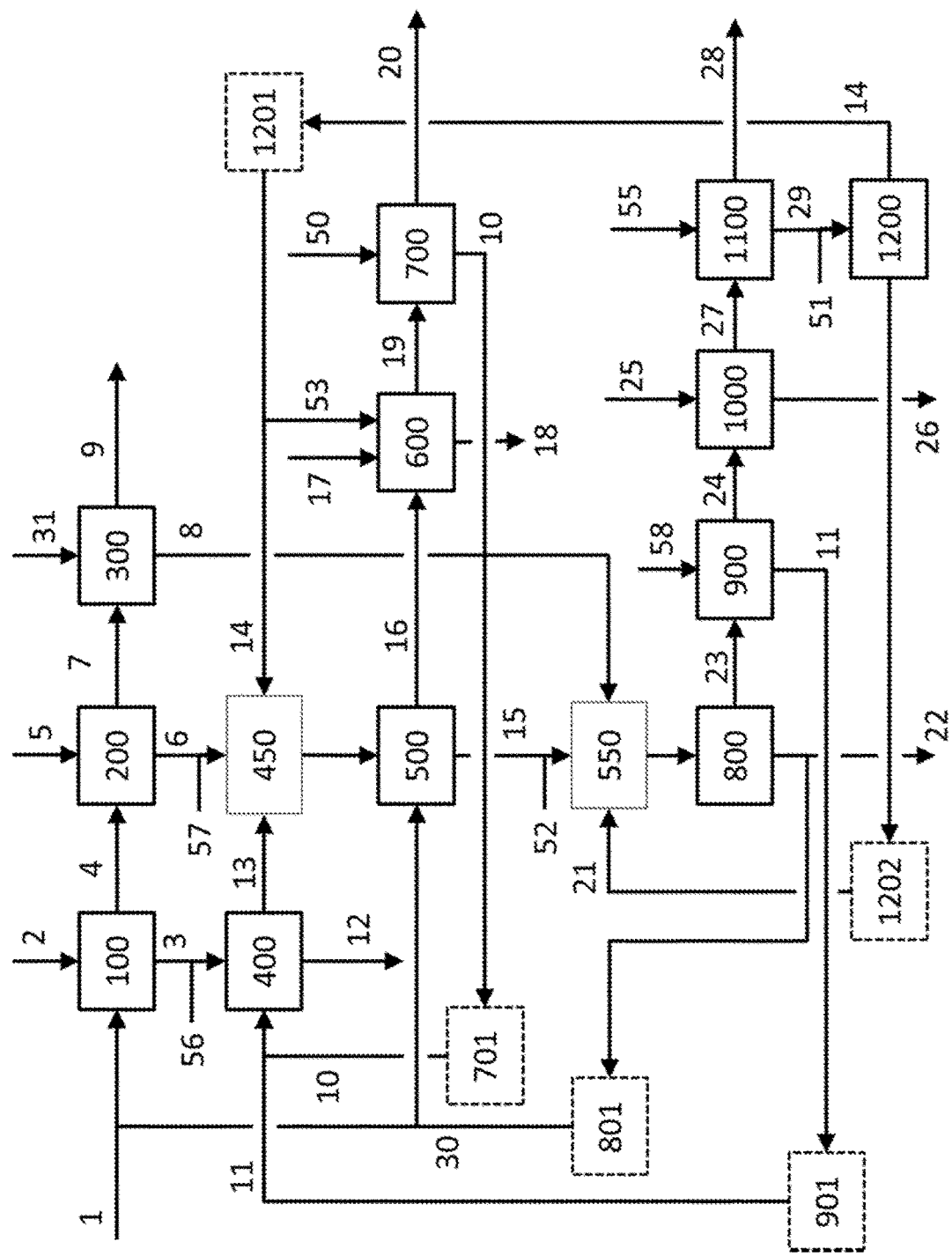

COPPER PRODUCTION PROCESS

FIELD OF THE INVENTION

The present invention relates to the production of non-ferrous metals by pyrometallurgy, in particular the production of copper (Cu) and so-called solder products. More particularly, the invention relates to an improved process for the co-production of copper and solder streams from primary and secondary feedstocks, as prime products for further upgrade to metal products of commercially desirable purities. Solder streams often belong to the family of metal compositions or alloys that contain significant amounts of tin (Sn), usually but not necessarily together with lead (Pb).

BACKGROUND OF THE INVENTION

The non-ferrous metals may be produced from fresh ores as the starting materials, also called primary sources, or from recyclable materials, also known as secondary feedstocks, or from a combination thereof. Recyclable materials may for instance be by-products, waste materials and end-of-life materials. The recovery of non-ferrous metals from secondary feedstocks has become an activity of paramount importance over the years. The recycling of non-ferrous metals after use has become a key contributor in the industry, because the demand for the metals continues to be strong and the availability of high quality fresh metal ores is reducing. In particular for the production of copper, its recovery from secondary feedstocks has become of significant industrial importance. In addition, the reducing availability of high quality fresh metal ores has also lead to a gain in importance of the recovery of non-ferrous metals from lower quality metal feedstock. The lower quality metal feedstocks for copper recovery may e.g. contain significant amounts of other non-ferrous metals. These other metals may by themselves have significant potential commercial value, such as tin and/or lead, but these primary and secondary feedstocks may contain other metals with a lower or even no economic value at all, such as zinc, bismuth, antimony, arsenic or nickel. Often these other metals are undesired in the prime commercial non-ferrous metal products, or may only be allowable at very limited levels.

The materials available as feedstock for the production of copper thus typically contain a plurality of metals. Secondary feedstocks rich in copper are for instance bronze, principally an alloy of copper and tin, and brass, an alloy of mainly copper and zinc.

These different metals need to be separated from the copper in the production process. The feedstocks may in addition include small proportions of a range of other elements including iron, bismuth, antimony, arsenic, aluminium, manganese, sulphur, phosphorus and silicon, most of which have a limited acceptability in a prime high-volume commercial metal product.

Secondary feedstocks containing copper may also be end-of-life electronic and/or electrical parts. These feedstocks typically comprise in addition to copper, the solder components, mainly tin and lead, but usually also comprise further metals such as iron and aluminium, plus occasionally minor amounts of precious metals, and also non-metallic parts, such as plastics, paint, rubber, glue, wood, paper, cardboard, etc. . . . . These feedstocks are typically not clean, and thus usually also contain further impurities such as dirt, grease, waxes, soil and/or sand. Many metals in such raw materials are often also partially oxidized.

Because the feedstocks having lower purities and higher contaminant levels, both primary and secondary feedstocks, are much more abundantly available, there is a need for broadening the capabilities of non-ferrous metal production processes for increasing the allowance of such low grade raw materials as part of the feedstocks for the recovery or production of non-ferrous metals such as copper.

The non-ferrous metal production processes typically contain at least one and usually a plurality of pyrometallurgical process steps. A very common first pyrometallurgical step for recovering copper from low grade secondary materials is a smelting step. In a smelting furnace the metals are molten, and organics and other combustible materials are burned off. In addition, various chemical reactions take place between many of the other components that are introduced into the smelter furnace. Metals having a relatively high affinity for oxygen convert to their oxides and collect in a lower density slag phase which comes floating on the molten metal phase. More volatile metals may escape the liquid into the gas phase and leave the furnace with the exhaust gasses, together with any carbon oxides and/or $SO_2$ that may be formed. The metals having a lower affinity for oxygen, if present in oxidized state readily reduce to their elemental metal form and move to the heavier and underlying metal phase. If not oxidized, these metals remain as elemental metal and remain in the higher density liquid metal phase in the bottom of the smelter furnace. In a copper production step, the smelting step may be operated such that most iron ends up in the slag, while copper, tin and lead end up in the metal product, a stream which is typically called "black copper". Also most of the nickel, antimony, arsenic and bismuth typically end up as part of the black copper product.

U.S. Pat. No. 3,682,623, as well as its counterparts AU 505015 B2 and AU 469773 B2, describes a copper refining process starting with a melting step leading to a black copper stream, followed by the further pyrometallurgical stepwise refining of this black copper to an anode grade copper stream, suitable for being cast into anodes for electrolytic refining. The refining of the black copper in U.S. Pat. No. 3,682,623 gave rise to the formation of a number of consecutive copper refining slags: the early slags being rich in zinc, the middle slags rich in lead and tin, and the terminal slags rich in copper. The different refining slags were accumulated and collected together, and transferred to a slag retreating furnace for recovery of the copper, lead and tin contained in those slags. In a first slag retreatment step, the accumulated copper refining slag was partially reduced, by the addition of copper/iron scrap, copper/aluminium alloy and burnt lime, such that a metal stream could be separated off (Table XIV) which recovered about 90% of the copper and about 85% of the nickel in the furnace. This tapped metal stream is in U.S. Pat. No. 3,682,623 labelled "black copper" and was recycled to the refining furnace, where it was mixed with the pre-refined black copper coming from the melting furnace and with radiators (Table VI). After tapping this black copper, an extracted slag remained in the furnace, which slag was in a subsequent step further reduced by charging to the furnace an amount of 98% iron scrap. This second reduction step yielded a lead/tin metal (i.e. a kind of "crude solder") which was tapped off for further processing, together with a spent slag (Table XV), which was presumably discarded. The solder metal product contained 3.00% wt of iron, 13.54% wt of copper and 1.57% wt of nickel, i.e. 18.11% wt in total. The spent slag contained 0.50% wt each of tin and lead, and 0.05% wt of copper.

Because the total amount of spent slag was very high, these low concentrations represent economically high amounts.

The process of U.S. Pat. No. 3,682,623 provides, for the black copper that is obtained as the prime product from the upstream melting step, one entry point into the refining furnace, i.e. at the start of the copper refining process sequence (Table VI). The upstream melting step accepts low quality and complex feedstocks, such as slags, scrap and ashes. The black copper obtained from the melting step is therefore based on materials that have little to no other outlet, and hence are available at highly attractive economic conditions. It would thus be of interest to be able to process as much as possible black copper from the upstream melting step.

For a given volumetric capacity of the copper refining furnace in U.S. Pat. No. 3,682,623, feeding more black copper to the first step in the copper refining process sequence would however require a reduction of the input of other feeds to that first step, i.e. the "radiators", and also of fresh feeds to the further steps in the copper refining process sequence. The metal stream recycled as "black copper" from the downstream slag retreatment furnace (Table XIV) has no other outlet, and therefore must indeed remain as part of the feeds to the first step of the copper refining process sequence (Table VI). Feeding more black copper feed to the copper refining sequence in U.S. Pat. No. 3,682,623 would thus be at the expense of other fresh feedstocks, to the first as well as to the subsequent copper refining steps.

There therefore remains a need for a pyrometallurgical copper production process capable of processing higher amounts of black copper originating from an upstream smelter step, without having to reduce the volume of other fresh feedstocks that may be fed to the first and/or subsequent steps of the copper refining process sequence.

The present invention aims to obviate or at least mitigate the above described problem and/or to provide improvements generally.

SUMMARY OF THE INVENTION

According to the invention, there is provided a process as defined in any of the accompanying claims.

In an embodiment, the present invention provides a process for the production of a crude solder product and a copper product comprising the step of
a) providing a black copper composition comprising at least 50% wt of copper together with at least 1.0% wt of tin and/or at least 1.0% wt of lead,
the process further comprising the steps of
(i) refining a first portion of the black copper composition obtained from step a) to obtain a refined copper product together with at least one copper refining slag,
(ii) recovering a first crude solder metal composition, as a first crude solder product, from the at least one copper refining slag, thereby forming a second solder refining slag in equilibrium with the first crude solder metal composition,
characterised in that the process further comprises the step of
f) contacting a second portion of the black copper composition from step a), different from the first portion, with the second solder refining slag thereby forming a second spent slag and a second lead-tin based metal composition, followed by separating the second spent slag from the second lead-tin based metal composition.

The applicants submit that a process according to the preamble of claim 1 is known from U.S. Pat. No. 3,682,623, AU 469773 B2 and AU 505015 B2. Example 1 in each one of these documents describes how its melting step plus final reduction step are able to provide a black copper composition as specified in step a) (Table VIII). A number of further oxidation steps, with details in Table IX, X, XI and XII, describe the refining of black copper, as specified in step (i), to the refined copper product of Table XII, together with a number of slags that are poured off and introduced into the slag retreating furnace at the start of Example 2. Example 2 describes the recovery of a crude solder metal composition (Metal in Table XV) from these slags, thereby also forming a solder refining slag (Slags in Table XV). The known art therefore teaches at least one method for obtaining the ingredients that are essential for enabling step f).

The second solder refining slag entering step f) contains valuable solder metals, i.e. Sn and/or Pb, some of this being in the form of the oxides thereof, and also some being entrained, in their elemental metal form. The black copper entering step f), possibly together with other fresh feed elements that may be added at this stage, contains at least the level of copper prescribed as part of step a). In the black copper, also some tin and lead is present, typically together with other metals that have under the process conditions a higher affinity for oxygen than copper, tin and/or lead.

The applicants have found that contacting the black copper with the second solder refining slag in step f) causes an extraction by the copper of Sn and/or Pb from the slag phase into the molten metal phase, and a reaction of oxides of Sn and/or Pb with metals in the black copper having a higher affinity for oxygen than copper, tin and/or lead, such as e.g. Fe or Zn. The applicants have found that these mechanisms are able to occur without causing an unacceptable loss of copper in the spent slag produced in step f).

The process according to the present invention surprisingly brings the advantage that the process is able to process a much higher amount of black copper feedstock than what the sequence of consecutive copper refining steps for producing a refined copper product, enriched in copper content and potentially up to having anode quality, is able to accommodate. The applicants have found that this may allow to increase the black copper processing capabilities of the overall process significantly, as compared to what the sequence of consecutive copper refining steps for producing a refined copper product, potentially and preferably even up to being of anode quality, is able to accept in its first step.

In order for a concentrated copper stream or product to have, or to be of anode quality, the applicants prefer the product to comprise at least 98.0% wt of copper, preferably at least 98.5% wt, more preferably at least 99.0% wt, even more preferably at least 99.5% wt, yet more preferably at least 99.8% wt of copper.

In addition to the advantage of being able to process much higher volumes of black copper from an upstream process step, the applicants have surprisingly found that the process according to the present invention is able to accommodate black copper having a lower level of copper and a higher level of other valuable metals, in particular of the solder metals tin and/or lead, preferably of tin and optionally also of lead.

This brings the advantage that the process according to the present invention is much more tolerant to elements other than copper, most of which being elements that have under the process conditions a higher affinity for oxygen than copper, and possibly even higher than tin and lead. This advantage opens the possibility to produce a higher amount of tin for the same amount of copper production, which brings a significant economic advantage to the operator of the process.

The applicants point out that the process according to the present invention generates in step f) a spent slag, i.e. a slag which is removed from the process. The purpose of step f) is to recover most of the tin and lead present in the furnace in the lead-tin based metal composition, a stream which is most suitable for recycling to a process step upstream of step f). This mode of operating step f) brings the advantage that also most copper and nickel present in the furnace, because copper and nickel have under the process conditions an even lower affinity for oxygen than tin and lead, are also ending up in the lead-tin based metal composition, and are therefore readily recycled and thus available for recovery as part of a prime product from the overall process. This mode of operating step f) further brings the advantage that most of the metals and other elements that, under the process conditions, have a higher affinity for oxygen than tin and/or lead, are reacting with oxides of metals having a lower affinity, such as tin and/or lead, and are thus ending up as part of the spent slag. This may apply for elements selected from the list of zinc, iron, aluminium, manganese, sulphur, phosphorus and silicon. Most of these "less noble" metals have a much lower commercial value than copper, tin and lead. The process according to the present invention readily removes most of these "less noble" metals, when introduced as part of the black copper portion fed to step f), immediately from the process as part of the spent slag obtained in step f).

The applicants have found that step f) is preferably operated as an extra reduction step f). Operating the step f) for treating the second solder refining slag allows the recovery of most of the solder metals from that stream, and strongly reduces the amounts of solder metals that are lost with the second spent slag produced in step f). The applicants have found that this additional recovery of valuable metals from the second solder refining slag allows for obtaining in the upstream step a first crude solder metal composition that is richer in the desired solder metals tin and/or lead, and hence leaner in the metals that are undesirable as part of the solder product, and which therefore should be removed. The removal of these other metals from the crude solder metal composition requires chemicals, in particular when the refining process comprises the treatment with silicon metal, such as explained in DE 102012005401 A1 for treating the raw tin product. Obtaining a crude solder metal composition containing less undesirable other metals thus brings significant economic benefits for the downstream refining of that crude solder metal composition.

The applicants have further found, linked to a higher production of crude solder product in an upstream pyrometallurgical step, and provided the second solder refining slag is kept in the same furnace, that more furnace volume becomes available for adding more black copper to the furnace charge of step f). The present invention therefore brings the advantage that more black copper may be processed as part of step f). More room for extra black copper in step f) means more room for additional copper, which allows for an increased recovery of tin and/or lead in step f) and a reduced presence of tin and/or lead in the spent slag from step f).

The applicants have found that the present invention also significantly relaxes the acceptance criteria for the black copper that is introduced in step f). This advantage significantly reduces any pre-refining needs before the black copper may be used as starting material for pyrometallurgical copper refining steps, as described in U.S. Pat. No. 3,682,623. This advantage also widens the acceptability criteria for the raw materials that are used in the upstream production of the black copper, usually in a smelter step. The upstream step is therefore able to accommodate much more low quality raw materials, which are usually more abundantly available at economically more attractive conditions.

The applicants have found that the addition of a significant amount of copper into step f), such as as part of the black copper composition that is introduced, brings a significant advantage because the copper may act as an excellent extracting agent for any other valuable metals that have remained in the second solder refining slag from step (ii), and that this advantageous extraction may be performed without losing significant amounts of copper in the second spent slag that is produced in step f).

The applicants have further found that the part of the second portion of the black copper composition which may be added into step f) may contain significant amounts of other valuable metals, in particular of zinc, nickel, tin and/or lead. The applicants have found, particularly when sufficient copper is made available in step f), that the losses of particularly tin and/or lead into the second spent slag may be kept very low and therefore do not jeopardize the possible further uses or routing of this second spent slag.

The applicants have found that in step f), a significant amount of the black copper which is provided in the step a), may be added into step f) for extracting more valuable metals out of the second solder refining slag obtained from step (ii) without excessively losing extra valuable metals into the second spent slag from step f). The applicants have found that the amounts of such black copper from e.g. an upstream smelter step that are acceptable in step f) are very significant, even of the order of magnitude of the amount of black copper that may be fed to the first step of the copper refining sequence. The applicants have found that the inclusion of step f) into the process according to the present invention significantly increases the capability to process smelter-type black copper, and hence to process higher amounts of the lower quality raw materials that bring valuable metals at low feedstock value and therefore with a high value upgrade potential. The applicants have found that this brings the further advantage that a significant portion of the black copper from the upstream smelter step may be processed without all that black copper needing to pass through the first step of the copper refining (i). Any metals in the black copper feed to step f) that have under the process conditions a higher affinity for oxygen than copper, tin and/or lead are most likely already removed before the copper introduced with this black copper fresh feed to step f) may find its way into the copper refining process step sequence (i).

BRIEF DESCRIPTION OF THE DRAWINGS

The FIG. 1 shows a flow diagram of a preferred embodiment of the process according to the present invention.

DETAILED DESCRIPTION

The present invention will hereinafter be described in particular embodiments, and with possible reference to particular drawings, but the invention is not limited thereto, but only by the claims. Any drawings described are only schematic and are non-limiting. In the drawings, the size of some of the elements may be exaggerated and not drawn to scale for illustrative purposes. The dimensions and the relative dimensions in the drawings do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than those described and/or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein may operate in other orientations than described or illustrated herein.

The term "comprising", as used in the claims, should not be considered as being limited to the elements that are listed in context with it. It does not exclude that there are other elements or steps. It should be considered as the presence provided of these features, integers, steps or components as required, but does not preclude the presence or addition of one or more other features, integers, steps or components, or groups thereof. Thus, the volume of "an article comprising means A and B" may not be limited to an object which is composed solely of agents A and B. It means that A and B are the only elements of interest to the subject matter in connection with the present invention. In accordance with this, the terms "comprise" or "embed" enclose also the more restrictive terms "consisting essentially of" and "consist of". By replacing "comprise" or "include" with "consist of" these terms therefore represent the basis of preferred but narrowed embodiments, which are also provided as part of the content of this document with regard to the present invention.

Unless specified otherwise, all values provided herein include up to and including the endpoints given, and the values of the constituents or components of the compositions are expressed in weight percent or % by weight of each ingredient in the composition.

Additionally, each compound used herein may be discussed interchangeably with respect to its chemical formula, chemical name, abbreviation, etc.

Within the context of the present invention, the terminology "at least partially" includes its endpoint "fully". Relating to the degree to which a particular oxidation or reduction step of the process is performed, the preferred embodiment is typically a partial performance. Relating to an addition or recycle of a process stream into a particular process step, the preferred embodiment is typically the "fully" operating point within the range that is covered by the terms "at least partially".

In this document and unless specified differently, amounts of metals and oxides are expressed in accordance with the typical practice in pyrometallurgy. The presence of each metal is typically expressed in its total presence, regardless whether the metal is present in its elemental form (oxidation state=0) or in any chemically bound form, typically in an oxidized form (oxidation state>0). For the metals which may relatively easily be reduced to their elemental forms, and which may occur as molten metal in the pyrometallurgical process, it is fairly common to express their presence in terms of their elemental metal form, even when the composition of a slag is given, wherein the majority of such metals may actually be present in an oxidized form. It is therefore that the composition of a slag in this document specifies the content of Fe, Zn, Pb, Cu, Sb, Bi as elemental metals. Less noble metals are more difficult to reduce under non-ferrous pyrometallurgical conditions and occur mostly in an oxidized form. These metals typically are expressed in terms of their most common oxide form. Therefore slag compositions are typically giving the content of Si, Ca, Al, Na respectively expressed as $SiO_2$, $CaO$, $Al_2O_3$, $Na_2O$.

Unless otherwise specified or for aqueous compositions, the concentrations are in this document expressed relative to the dry weight of the total composition, hence excluding any water or moisture present.

The applicants have found that the results of a chemical analysis of a metal phase is significantly more reliable than these of a slag phase analysis. Where in this document numbers are derived from a material balance over one or more process steps, the applicants prefer by far, if possible, to base such calculations on as much as possible metal phase analyses, and to minimise the use of slag analyses. For instance, the applicants prefer to calculate the recovery of tin and/or lead in the first copper refining slag from step b) based on the amount of tin and/or lead in the combined feeds to step b) that is not anymore retrieved in the first enriched copper metal phase from step b), rather than based on the tin and/or lead concentration reported for the first copper refining slag.

The applicants have further found that an analysis of a slag phase which is further processed may often be corrected by making a mass balance over the downstream process step or steps, and by back-calculating, using the amounts of the products obtained from the downstream step in combination with the analysis of these products, at least one preferably being a liquid metal product offering much more reliable analytical results. Such a back-calculation may be performed for several of the relevant particular metals individually, and may enable the establishment of reliable material balances over most individual steps of the process according to the present invention. Such a back-calculation may also be instrumental in determining the composition of a liquid metal stream from which the obtaining of a representative sample may be highly challenging, e.g. a molten solder metal stream containing high amounts of lead together with tin.

The applicants prefer to use X-Ray Fluorescence (XRF) for analysing a metal phase in the context of the present invention. The applicants prefer for this analysis to take a sample of the molten liquid metal, and the applicants prefer to use a sampler for instant analytical purposes in copper refining from the company Heraeus Electro Nite, which results quickly in a solid and cooled sample for further processing. A surface of the cold sample is than suitably surface treated before the analysis is performed by use of an XRF probe. The XRF analytical technique however does not analyse for the level of oxygen in the sample. If needed, for establishing the complete composition of a metal phase including the oxygen content, the applicants therefore prefer to separately measure the oxygen content of the metal in the molten liquid metal present in the furnace, preferably by using a disposable one-time electrochemical sensor for batch processes in copper refining offered by the company Heraeus Electro Nite. The analytical result of the metal phase analysis by XRF, as described above, may then be adjusted, if desired, for the oxygen content obtained from the separate oxygen analysis. The compositions reported in the Example of this document have not been adjusted for inclusion of their oxygen content.

The present invention is primarily concerned with the recovery of the target metals copper, nickel, tin and/or lead into product streams suitable for deriving therefrom prime metal products of high purity. The process according to the present invention comprises different process steps and these process steps may be labelled as either an oxidation step or a reduction step. With this label, the applicants want to address the chemical reactions which these target metals may be subject to. A reduction step is thus comprising that at least one of these target metals is being reduced from at least one of its corresponding oxides to its elemental metal form, with the intention to move that metal from the slag phase to the metal phase in the furnace. Such a reduction step is preferably promoted by the addition of a reducing agent, as explained at several locations in this document. As reduction steps qualify the process steps with references 400, 600, 700, 900, 1000 and 1100. In an oxidation step, the main purpose is the conversion of at least one of the target metals to at least one of its corresponding oxides, with the intention to move that metal from the metal phase to the slag phase in the furnace. The oxygen for that conversion may in the context of the present invention be supplied from a variety of sources. The oxygen does not necessarily have to come from air or oxygen that may be blown into the liquid bath. The oxygen may equally be supplied by the introduction of a slag phase that was obtained from another process step and in which the oxygen is bound in an oxide of at least one other metal. An oxidation step in the context of the present invention may thus possibly be performed without any injection of air or oxygen. As oxidation steps therefore qualify the process steps with references 100, 200, 300, 500, 800 and 1200.

From the target metals which the present invention is recovering, Sn and Pb are considered "the solder metals". These metals distinguish themselves from the other target metals copper and nickel because mixtures containing major amounts of these metals usually have a much lower melting point than mixtures containing major amounts of copper and/or nickel. Such compositions have been used already millennia ago for creating a permanent bond between two metal pieces, and this by first melting the "solder", bringing it in place, and letting it solidify. The solder therefore needed to have a lower melting temperature than the metal of the pieces it was connecting. In the context of the present invention, a solder product or a solder metal composition, two terms which are used interchangeably throughout this document, mean metal compositions in which the combination of the solder metals, thus the level of Pb plus Sn, represents the major portion of the composition, i.e. at least 50% wt and preferably at least 65% wt. The solder product may further contain minor levels of the other target metals copper and/or nickel, and of non-target metals, such as Sb, As, Bi, Zn, Al and/or Fe, and/or elements such as Si. In the context of the present invention, because the process is directed to the production of a crude solder product and a copper product, the crude solder product or crude solder metal composition obtained by the process in steps e) and/or n) is expected to contain a measurable amount of at least copper, if only as an inevitable impurity.

The refined copper product obtained in step (i) is obtained by refining the first portion of the black copper composition. Consequently and inherently, the refined copper product obtained in step (i) must necessarily have a higher copper content than the black copper composition from which it was derived by at least one refining step.

In an embodiment of the process according to the present invention, step f) comprises adding a third reducing agent to step f).

The applicants have found that the third reducing agent allows to drive the result of reduction step f) towards the desired separation of valuable metals into the second lead-tin based metal composition and maintaining rejectable metals into the second spent slag. The applicants have found that the third reducing agent may be a gas such as methane or natural gas, but may also be a solid or a liquid, such as carbon, a hydrocarbon, even aluminium or iron.

In an embodiment of the process according to the present invention, the third reducing agent comprises, and preferably is, a metal having under the process conditions a higher affinity for oxygen than tin and lead, copper and nickel, preferably iron metal, more preferably scrap iron. The applicants prefer to use iron, preferably scrap iron as the reducing agent, because of its high availability at economically very attractive conditions. The applicants have found that the addition of the solid reducing agent may bring the additional benefit that the furnace requires less additional heating in order to maintain or reach its desired temperature. The applicants have found that this benefit may be sufficiently large such that additional heating by burning a fuel using air and/or oxygen may be limited or even hardly required in order to reach the desired temperature. The applicants have further found that the step f) may further benefit from the addition of silica, as explained elsewhere in this document.

The applicants prefer to add to step f) an amount of third reducing agent that is rich in iron, preferably as multimetal material, because this multimetal material is more readily available at more advantageous conditions than higher purity tin, higher purity copper or higher purity iron. Another suitable material may be electric motors, preferably such motors after use, because of their high contents of iron for the cores and copper for the windings. The applicants have found that the copper and/or tin may readily be kept in the metal phase and be kept from moving into the slag phase, while any iron into this copper-containing fresh feed readily moves into the slag phase as iron oxide, while it helps the chemical reduction of other metals that have under the process conditions a lower affinity for oxygen than iron.

In an embodiment of the present invention the process further comprises the steps of (iii) recovering a second crude solder metal composition, different from the first crude solder metal composition, as a second crude solder product, from the at least one copper refining slag, thereby forming a fifth solder refining slag in equilibrium with the second crude solder metal composition, and o) contacting a third portion of the black copper composition obtained from step a), different from the first portion and from the second portion, with the fifth solder refining slag, thereby forming a third spent slag and a third lead-tin based metal composition, followed by separating the third spent slag from the third lead-tin based metal composition.

The applicants have found that it may be advantageous to recover also a second crude solder product, different from the first crude solder product, from the at least one copper refining slag obtained from refining the first portion of the black copper composition obtained from step a). The applicants have found that this brings the benefit that the separation may be better between the refined copper product on the one hand, and the first and second crude solder products on the other hand. The applicants submit that this advantage, and how it is obtained, is explained in more detail in EP-A-17207370.2.

The process according to the present invention comprising step (iii) also generates the fifth solder refining slag. The applicants have found that it is advantageous to also contact, i.e. comprising react and extract, this fifth solder refining slag with a third portion of the black copper obtained from step a), the third portion being different from the first and from the second portion of black copper.

The process according to the present invention including step o) surprisingly further enhances the advantage that the process is able to process a much higher amount of black copper feedstock than what the sequence of consecutive copper refining steps for producing a refined copper product, enriched in copper content and potentially up to having anode quality, is able to accommodate. The applicants have found that this may allow to further increase the black copper processing capabilities of the overall process significantly, as compared to what the sequence of consecutive copper refining steps for producing a refined copper product, potentially and preferably even up to being of anode quality, is able to accept in its first step.

In addition to the advantage of being able to process much higher volumes of black copper originating from an upstream process step, the applicants have surprisingly found that the process according to the present invention is able to accommodate black copper having a lower level of copper and a higher level of other valuable metals, in particular of the solder metals tin and/or lead, preferably of tin and optionally also of lead.

This brings the advantage that the process according to the present invention is even more tolerant to elements other than copper, most of which being elements that have under the process conditions a higher affinity for oxygen than copper, and possibly even higher than tin and lead. This advantage further widens the possibility to produce a higher amount of tin for the same amount of copper production, which brings a significant economic advantage to the operator of the process.

The applicants point out that the process according to the present invention generates in step o) the third spent slag, i.e. a slag which is removed from the process. The purpose of step o) is to recover most of the tin and lead present in the furnace as part of the third lead-tin based metal composition, a stream which is most suitable for recycling to a process step upstream of step o). This mode of operating step o) brings the advantage that also most copper and nickel present in the furnace, because copper and nickel have under the process conditions an even lower affinity for oxygen than tin and lead, are ending up in the third lead-tin based metal composition, and are therefore readily recycled and thus available for recovery as part of a prime product from the overall process. This mode of operating step o) further brings the advantage that most of the metals and other elements that, under the process conditions, have a higher affinity for oxygen than tin and/or lead, are ending up as part of the third spent slag. This may apply to elements such as zinc, iron, aluminium, manganese, sulphur, phosphorus and silicon. Most of these "less noble" metals have a much lower commercial value than copper, tin and lead. The process according to the present invention readily removes most of these "less noble" metals, when introduced as part of the black copper portion fed to step o), immediately from the process as part of the third spent slag obtained in step o).

The applicants have found that the present invention therefore further relaxes the acceptance criteria for the black copper that is introduced in step o). This advantage significantly reduces any pre-refining needs before the black copper may be used as starting material for pyrometallurgical copper refining steps, as described in U.S. Pat. No. 3,682,623. This advantage also widens the acceptability criteria for the raw materials that are used in the upstream production of the black copper, usually in a smelter step. The upstream step is therefore able to accommodate much more low quality raw materials, which are usually more abundantly available at economically more attractive conditions.

The applicants have found that the addition of a significant amount of copper into step o), such as as part of the black copper composition that is introduced, brings a significant advantage because the copper may act as an excellent extracting agent for any other valuable metals that have remained in the fifth solder refining slag from step (iii), and that this advantageous extraction may be performed without losing significant amounts of copper in the third spent slag that is produced in step o).

The applicants have further found that the part of the third portion of the black copper composition which may be added into step o) may contain significant amounts of other valuable metals, in particular of zinc, nickel, tin and/or lead. The applicants have found, particularly when sufficient copper is made available in step o), that the losses of particularly tin and/or lead into the third spent slag may be kept very low and therefore do not jeopardize the possible further uses or routing of this third spent slag.

The applicants have found that in step o), a significant amount of the black copper which is provided in step a), may be added into step o) for extracting more valuable metals out of the fifth solder refining slag obtained from step (iii) without excessively losing extra valuable metals into the third spent slag produced in step o). The applicants have found that the amounts of such black copper from e.g. an upstream smelter step that are acceptable in step o) are very significant, even of the order of magnitude of the amount of black copper that may be fed to the first step of the copper refining sequence. The applicants have found that the inclusion of step o) into the process according to the present invention significantly further increases the capability to process smelter-type black copper, and hence to process higher amounts of the lower quality raw materials that bring valuable metals at low feedstock value and therefore with a high value upgrade potential. The applicants have found that this further extends the further advantage that again a significant third portion of the black copper from the upstream smelter step may be processed without all that black copper needing to pass through the first step of the copper refining (i). Any metals in the black copper feed to step o) that have under the process conditions a higher affinity for oxygen than copper, tin and/or lead are most likely already removed before the copper introduced with this black copper fresh feed to step o) may find its way into the copper refining process step sequence (i).

In an embodiment of the process according to the present invention, step o) comprises adding a sixth reducing agent to step o), preferably before reducing the fifth solder refining slag.

The applicants have found that the sixth reducing agent allows to drive the result of reduction step o) towards the desired separation of valuable metals into the third lead-tin based metal composition and maintaining rejectable metals into the third spent slag. The applicants have found that the sixth reducing agent may be a gas such as methane or natural gas, but may also be a solid or a liquid, such as carbon, a hydrocarbon, even aluminium or iron.

In an embodiment of the process according to the present invention including step o), the sixth reducing agent comprises, and preferably primarily is, a metal having under the process conditions a higher affinity for oxygen than tin, lead, copper and nickel, preferably iron metal, more preferably scrap iron. The applicants prefer to use iron, preferably scrap iron as the reducing agent, because of its high availability at economically very attractive conditions. The applicants have found that the addition of the solid reducing agent may bring the additional benefit that the furnace requires less additional heating in order to maintain or reach its desired temperature. The applicants have found that this benefit may be sufficiently large such that additional heating by burning a fuel using air and/or oxygen may be fairly limited or even hardly be required in order to reach the desired temperature. The applicants have further found that the step f) may further benefit from the addition of silica, as explained elsewhere in this document.

The applicants prefer to add to step o) an amount of sixth reducing agent that is rich in iron and may further contain copper, preferably as multimetal material, because this multimetal material is more readily available at more advantageous conditions than higher purity tin, higher purity copper or higher purity iron. Another suitable material may be electric motors, preferably such motors after use, because of their high contents of iron for the cores and copper for the windings. The applicants have found that the copper and/or tin may readily be kept in the metal phase and be kept from moving into the slag phase, while any iron into this copper-containing fresh feed readily moves into the slag phase as iron oxide, while it helps the chemical reduction of other metals that have under the process conditions a lower affinity for oxygen than iron.

In an embodiment of the process according to the present invention, the second and/or the fifth solder refining slag comprises at most 2.0% wt together of copper and nickel, preferably at most 1.5% wt, more preferably at most 1.0% wt, even more preferably at most 0.5% wt, preferably at most 0.45% wt, more preferably at most 0.40% wt together of copper and nickel. The second solder refining slag is at the end of step e) in equilibrium with the first crude solder metal composition, and the fifth solder refining slag is at the end of step n) in equilibrium with the second crude solder metal composition. Less copper and nickel in the second and/or fifth solder refining slag means that there is also less copper and nickel in the first and/or second crude solder metal composition, which at the end of the upstream pyrometallurgical steps is in equilibrium with the second and/or the fifth solder refining slag. The advantages of having less copper and nickel in the second and/or fifth solder refining slag therefore include the advantages explained elsewhere in this document with respect to having less copper and/or nickel in the first and/or fourth solder refining slag. In addition, this feature brings the further benefit that less copper and nickel may end up in the second and/or the third lead-tin based metal composition respectively obtained in step f) and step o) and would need to be recovered therefrom. Another advantage is that more furnace volume becomes available for step f) and/or step o), allowing for a higher amount of black copper to be introduced as part of step f) and/or step o).

In an embodiment of the process according to the present invention, the second and/or the fifth solder refining slag comprises at most 8.0% wt and optionally at least 1.0% wt together of tin and lead, preferably at most 7.0% wt, more preferably at most 6.0% wt, even more preferably at most 5.0% wt, preferably at most 4.5% wt, more preferably at most 4.0% wt, even more preferably at most 3.5% wt together of tin and lead. The applicants have found that it is advantageous to limit the presence of tin and lead in the second and/or fifth solder refining slag at the end of the respective upstream process step because most of these amounts of tin and lead that need to be recovered in step f) and/or o), end up in the second and/or third lead-tin based metal composition, and need to be further processed for their recovery into prime high quality metal products. It is also important to recover tin and in particular lead upstream of producing the second spent slag in step f) and the third spend slag in step o). Typically any tin and/or lead ending up in a spent slag represents a loss of valuable metals from the process, and may impose further treatment before the spent slag may be disposed of, or be suitable for use in an economically more valuable application.

On the other hand, the applicants also prefer to have at least 1.5% wt together of tin and lead in the second and/or the fifth solder refining slag, preferably at least 2.0% wt, more preferably at least 2.5% wt, even more preferably at least 3.0% wt, preferably at least 3.5% wt. This brings the advantage of also having more tin and lead together in the first and/or the second crude solder metal composition, which at the end of the respective upstream process step is expected to be in equilibrium with the second and/or the fifth solder refining slag, and of which the advantages are explained elsewhere in this document.

In an embodiment of the process according to the present invention, the second and/or the third lead-tin based metal composition comprises at least 60% wt and optionally at most 90% wt together of copper and nickel, preferably at least 65% wt, more preferably at least 68% wt, even more preferably at least 70% wt, even more preferably at least 72% wt together of copper and nickel. The applicants have found that a high amount of copper and nickel together, in particular a high amount of copper, in the second lead-tin based metal composition at the end of step f) and/or in the third lead-tin based metal composition at the end of step o) is advantageous. The copper and also the nickel act in steps f) and o) as extracting agents for other valuable metals, in particular for tin and lead, and the phase equilibrium of copper and nickel makes this feasible under the correct conditions without at the same time causing an unacceptably high loss of copper and/or nickel in the second and/or third spent slag.

On the other hand, the applicants prefer the second and/or third lead-tin based metal composition to comprise at most 85% wt, preferably at most 82% wt, more preferably at most 80% wt, even more preferably at most 77.5% wt, preferably at most 75% wt together of copper and nickel. This leaves more room for recovering tin and/or lead and reduce the loss of tin and/or lead in the spent slag from step f) and/or step o). The applicants have also found that compliance with this upper limit strongly reduces the loss of valuable metals, in particular of copper, in the spent slag at the end of step f) and/or o).

In an embodiment of the process according to the present invention, the second and/or third lead-tin based metal composition comprises at least 12% wt together of tin and lead, preferably at least 15% wt, more preferably at least 17% wt, even more preferably at least 18% wt, preferably at least 19% wt, more preferably at least 20% wt, even more preferably at least 21% wt, preferably at least 22% wt together of tin and lead. The applicants have found that a minimum presence of metals other than copper, such as a minimum presence together of tin and lead, in the metal phase at the end of step f) and/or o) brings the advantage that less copper is lost in the spent slag which is at the end of step f) and/or o) in equilibrium therewith.

In an embodiment of the process according to the present invention, the second and/or the third lead-tin based metal composition comprises at least 60% wt and optionally at most 85% wt of copper, preferably at least 65% wt, more preferably at least 67% wt, even more preferably at least 69% wt, preferably at least 70% wt, more preferably at least 71% wt of copper. The applicants have found that in particular a high amount of copper in the second and/or third lead-tin based metal composition at the end of step f) and/or o) is advantageous. The copper acts in steps f) and/or o) as an extracting agent for other valuable metals, in particular for tin and lead, and the phase equilibrium of copper makes this feasible under the correct conditions without at the same time causing an unacceptably high loss of copper in the second and/or third spent slag.

On the other hand, the applicants prefer the second and/or third lead-tin based metal composition to comprise at most 82.5% wt of copper, preferably at most 80% wt, more preferably at most 77.5% wt, even more preferably at most 75% wt, preferably at most 72.5% wt of copper. This leaves more room for recovering tin and/or lead and reduce the loss of tin and/or lead in the spent slag from step f) and/or o). The applicants have also found that compliance with this upper limit strongly reduces the loss of valuable copper in the spent slag at the end of step f) and/or o).

In an embodiment of the process according to the present invention, the second and/or the third spent slag comprises at most 2.5% wt together of tin and lead, preferably at most 2.0% wt, more preferably at most 1.5% wt, even more preferably at most 1.00% wt, preferably at most 0.95% wt together of tin and lead.

In an embodiment of the process according to the present invention, the second and/or third spent slag comprises at most 2.0% wt together of copper and nickel, preferably at most 1.5% wt, more preferably at most 1.0% wt, even more preferably at most 0.75% wt, preferably at most 0.60% wt together of copper and nickel.

In an embodiment of the process according to the present invention, the second and/or third spent slag comprises at most 2.0% wt of copper, preferably at most 1.5% wt, more preferably at most 1.0% wt, even more preferably at most 0.70% wt of copper.

The specified upper limits on the presence of copper, nickel, tin, lead and any combination of these metals together, each individually brings the benefit that the economic value of the amounts of the target metals leaving the process with the second and/or third spent slag from step f) and/or o) is kept limited. It reduces the need or desire to provide extra process steps on the second and/or third spent slag before this may be discarded, and thus offers the benefit that fewer or possibly even no further treatment steps are necessary before the second and/or third spent slag may be disposed of or before the slag is considered acceptable in an economically more attractive application or end-use.

In the second and/or third spent slag of the process according to the present invention are retrieved most of the elements that under the process conditions have a higher affinity for oxygen than tin and/or lead and/or copper and/or nickel. This is particularly valid for metals such as zinc, chromium, manganese, vanadium, titanium, iron, aluminium, sodium, potassium, calcium and other alkali and earth-alkali metals, but also for other elements such as silicon or phosphorus. Any of these elements ending up in the second and/or third spent slag are removed from the process, and do not occupy useful furnace volume as compared as when they would be recycled to an upstream process step.

In an embodiment of the process according to the present invention, the black copper composition complies with at least one and preferably with all of the following conditions:

comprising at least 51% wt of copper,
comprising at most 96.9% wt of copper,
comprising at least 0.1% wt of nickel,
comprising at most 4.0% wt of nickel,
comprising at least 1.5% wt of tin,
comprising at most 15% wt of tin,
comprising at least 1.5% wt of lead,
comprising at most 25% wt of lead,
comprising at most 3.5% wt of iron, and
comprising at most 8.0% wt of zinc.

The applicants prefer that any black copper which may be used in the process according to the present invention, i.e. also any black copper used in a process step other than step f), complies with at least one of the above conditions, and preferably with all.

In an embodiment of the process according to the present invention, the black copper comprises at most 96.9% wt or better at most 96.5% wt of copper, preferably at most 96.0% wt, more preferably at most 95.0% wt, even more preferably at most 90.0% wt, yet more preferably at most 85.0% wt, preferably at most 83.0% wt, more preferably at most 81.0% wt, even more preferably at most 80.0% wt, yet more preferably less than 80.0% wt and preferably at most 79.0% wt of copper. It brings the advantage that the upstream process for producing the black copper may accept raw materials comprising much more metals other than copper. It is particularly advantageous to accept more tin and/or lead in the production of the black copper, and these higher amounts of tin and/or lead may readily be processed into an increased amount of crude solder co-product, a product that is having a relatively high economic value.

In an embodiment of the process according to the present invention, the black copper comprises at least 51% wt of copper, preferably at least 52% wt, more preferably at least 53% wt, even more preferably at least 54% wt, yet more preferably at least 55% wt, preferably at least 57% wt, more preferably at least 59% wt, even more preferably at least 60% wt, yet more preferably at least 62% wt, preferably at least 64% wt, more preferably at least 66% wt, even more preferably at least 68% wt, yet more preferably at least 70% wt, preferably at least 71% wt, more preferably at least 72% wt, even more preferably at least 73% wt, yet more preferably at least 74% wt, preferably at least 75% wt, more preferably at least 77.5% wt, even more preferably at least 80% wt, yet more preferably at least 85% wt of copper.

This brings the advantage that a pre-refining step, such as provided in U.S. Pat. No. 3,682,623 for upgrading a black copper containing 75-80% wt of copper to about 85% wt of copper or higher (85.12% wt of copper in the Example, Table VI), may be dispensed with.

The applicants have further found that the overall process is more operable and efficient, and usually produces more of the prime products, if the copper concentration in the black copper stays within the prescribed lower limit. With a lower copper concentration in the black copper, other elements make up the balance. This is quite acceptable and often even desirable if it are valuable metals that make up the balance, such as lead, but even more interestingly when also including tin. These metals consume chemicals during any oxidation and/or reduction step, but ultimately a major part thereof ends up in a prime product stream. If, however and on the contrary, it are lower value metals or elements which inevitably end up in one of the spent process slags that make up the balance, then the lower copper concentration is rather disadvantageous because these metals and/or elements consume chemicals in the oxidation steps as part of the copper refining steps, and/or may consume other chemicals in one of the downstream reduction steps. In addition, these low value metals or elements take up volume in the furnace, and their presence therefore demands bigger furnaces and hence a higher investment cost. Within a given available equipment size, the presence of these metals or elements tightens the restrictions on introducing into any of the process steps higher value raw materials such as those containing high concentrations of copper, tin and/or lead. The black copper composition is typically an intermediate produced by another pyrometallurgical process step, i.e. a smelter step. A smelter step results in a molten metal product, the so-called "black copper", and a liquid slag of primarily metal oxides, usually in the presence of significant amounts of silica. The applicants prefer in a smelter step to obtain a black copper product having at least the minimum amount of copper as specified, because the high copper presence acts as an extracting agent for other valuable metals, e.g. tin and lead. Keeping the copper concentration in the black copper composition above the specified limit therefore results in a higher recovery of these other valuable metals present in the black copper composition, rather than losing these valuable metals as part of the smelter slag, in which these metals typically have little to no value and even may represent a burden.

In an embodiment of the process according to the present invention, the black copper comprises at least 1.5% wt of tin, more preferably at least 2.0% wt, even more preferably at least 2.5% wt, yet more preferably at least 3.0% wt, preferably at least 3.5% wt, more preferably at least 3.75% wt, even more preferably at least 4.0% wt, yet more preferably at least 4.5% wt, preferably at least 5.0% wt, more preferably at least 5.5% wt, even more preferably at least 6.0% wt, yet more preferably at least 6.5% wt, preferably at least 7.0% wt, more preferably at least 7.5% wt, even more preferably at least 8.0% wt, yet more preferably at least 8.5% wt, preferably at least 9.0% wt, more preferably at least 9.5% wt, even more preferably at least 10.0% wt, yet more preferably at least 11.0% wt of tin. Tin is a highly valuable metal which is in its higher purity product form rather scarcely available. The applicants therefore prefer to produce as much tin as their process is able to handle. In addition, the applicants prefer to recover this tin from raw materials of low economic value, in which tin is typically present in low concentrations. Such low value raw materials often contain high amounts of elements that are difficult to process in a pyrometallurgical copper refining process, and therefore are usually first processed in a smelter step. The tin in those low value raw materials therefore mainly ends up as part of the black copper composition. The applicants prefer to process as much tin as possible from such low value raw materials, and hence prefer to have the black copper composition of the process according to the present invention contain as much tin as possible within the other process constraints.

In an embodiment of the process according to the present invention, the black copper comprises at least 1.5% wt of lead, more preferably at least 2.0% wt, even more preferably at least 2.5% wt, yet more preferably at least 3.0% wt, preferably at least 3.5% wt, more preferably at least 3.75% wt, even more preferably at least 4.0% wt, yet more preferably at least 4.5% wt, preferably at least 5.0% wt, more preferably at least 5.5% wt, even more preferably at least 6.0% wt, yet more preferably at least 7.0% wt, preferably at least 8.0% wt, more preferably at least 9.0% wt, even more preferably at least 10.0% wt, yet more preferably at least 11.0% wt, preferably at least 12.0% wt, more preferably at least 13.0% wt, even more preferably at least 14.0% wt, yet more preferably at least 15.0% wt of lead.

Lead is also a valuable metal. In addition, the presence of lead facilitates the recovery of the even higher valuable tin metal, because it behaves similarly like tin, ends up in the same process streams, forming a mixture called "solder", and the resulting solder streams have a higher density and are therefore easier to separate from lower density liquid streams such as slag or solid streams such as dross. The applicants therefore prefer to have a significant amount of lead in their process. In addition, the applicants prefer to recover this lead from raw materials of low economic value, in which lead is typically present in low concentrations. Such low value raw materials often contain high amounts of elements that are difficult to process in a pyrometallurgical copper refining process, and therefore are usually first processed in a smelter step. The lead in those low value raw materials therefore mainly ends up as part of the black copper composition. The applicants prefer to obtain as much lead as possible from such low value raw materials, and hence prefer to have the black copper composition of the process according to the present invention contain as much lead as possible within the other process constraints.

A higher presence of tin and/or lead in the black copper brings the advantage that the raw materials containing this tin and/or lead may be processed in a smelter step, a step which is highly tolerant for other impurities, much higher than this of the typical steps performed as part of a copper refining process, including any steps associated with co-production of other non-ferrous metals such as tin and/or lead. These acceptable raw materials thus typically are of much lower quality and hence also lower economic value. Most of the tin and/or lead in the black copper of the process according to the present invention ends up in a crude solder co-product, which is a product of relatively high economic value. The economic upgrade of the tin and/or lead in the black copper fed to the process according to the present invention is therefore typically much higher than a same amount introduced as part of a much more concentrated raw material that may be acceptable directly in one of the steps in the copper refining process, including ancillaries.

The applicants therefore prefer to have higher amounts of tin and/or lead in the black copper, because it brings the advantage that within a limited amount of these metals to be produced because of equipment limitations, more of these metals are being recovered from low value raw materials, and hence more of these metals may be recovered with a high economic upgrade from their lower value in the raw material and their high economic value in the final product.

In an embodiment of the process according to the present invention, the black copper comprises at most 15.0% wt of tin, preferably at most 14.0% wt, more preferably at most 13.0% wt, even more preferably at most 12.0% wt, yet more preferably at most 11.0% wt, preferably at most 10.0% wt, more preferably at most 9.0% wt, even more preferably at most 8.0% wt, yet more preferably at most 7.0% wt, preferably at most 6.0% wt of tin. The applicants have found that limiting the tin concentration in the black copper composition to the specified upper limits brings the advantage that sufficient room is left in the black copper composition for other metals and elements. As argued above, copper presence is highly advantageous in the upstream smelter step, and so is the presence of lead. The applicants therefore prefer to keep the concentration of tin within the specified upper limit.

In an embodiment of the process according to the present invention, the black copper comprises at most 25.0% wt of lead, preferably at most 24.0% wt, more preferably at most 23.0% wt, even more preferably at most 22.0% wt, yet more preferably at most 21.0% wt, preferably at most 20.0% wt, more preferably at most 19.0% wt, even more preferably at most 18.0% wt, yet more preferably at most 17.0% wt, preferably at most 16.0% wt, more preferably at most 15.0% wt, yet more preferably at most 14.0% wt, even more preferably at most 13.0% wt, yet more preferably at most 12.0% wt, preferably at most 11.0% wt, more preferably at most 10.0% wt, even more preferably at most 9.0% wt, yet more preferably at most 8.0% wt, preferably at most 7.0% wt of lead. The applicants have found that limiting the lead concentration in the black copper composition to the specified upper limits brings the advantage that sufficient room is left in the black copper composition for other metals and elements. As argued above, copper presence is highly advantageous in the upstream smelter step, and also the presence of significant amounts of tin is highly desirable. The applicants, therefore, prefer to keep the concentration of lead within the specified upper limit.

The applicants have found that excessive amounts of tin and/or lead in the black copper affect any separation step between copper (and nickel) on the one hand and of tin and lead on the other hand. The separation is less clear, and more tin and/or lead tends to stay with the copper. Even if the copper stream is at least partially recycled, this causes higher amounts of tin and/or lead to circulate around in the process and taking up furnace volume. But also if the copper stream from that separation, or part thereof, is removed from the process, the higher amounts of tin and/or lead in that stream represent an extra burden for its downstream processing. In an embodiment of the process according to the present invention, the black copper comprises at least 0.1% wt and optionally at most 4.0% wt of nickel (Ni). Preferably the black copper feed to step b), which is introduced further below in this document, comprises at least 0.2% wt of nickel, more preferably at least 0.3% wt, even more preferably at least 0.4% wt, yet more preferably at least 0.5% wt, preferably at least 0.75% wt, more preferably at least 1.00% wt of nickel.

Nickel is a metal that is present in many raw materials containing copper, tin and/or lead, and it is also present in many alloys containing or even based on iron. Nickel exhibits under the furnace conditions an affinity for oxygen that is lower than tin and/or lead, close to and somewhat higher than this of copper. It is therefore a metal that is difficult to separate from copper by pyrometallurgy. In U.S. Pat. No. 3,682,623, most of the nickel comprised in the pre-refined black copper (Table VI, 541.8 kg) leaves the process as an impurity in the refined copper product (Table XII, 300 kg), which was cast into anodes (col. 19, lines 61-62). A minor amount of the nickel finds its way into the lead/tin metal product (Table XV, 110 kg). The process comprises a significant recycle stream of black copper, in which nickel appears to increase with each cycle (Table XIV, 630 kg compared to Table VI, 500 kg). The applicants have found that nickel in the copper anodes is a disturbing element in the downstream electrorefining step. Under the electrorefining process conditions, the nickel dissolves in the electrolyte but does not deposit on the cathode. It therefore may build up in the electrolyte and may possibly lead to nickel salts precipitating when exceeding their solubility limit. But even at lower levels, the nickel may already lead to anode passivation because of a possible build-up of a nickel concentration gradient at the anode surface. The process of U.S. Pat. No. 3,682,623 is thus limited in its nickel handling capabilities. The melting step in U.S. Pat. No. 3,682,623 may therefore only accept a rather limited amount of raw materials that contain significant amounts of nickel.

The applicants have now found that the process according to the present invention is able to accept much higher amounts of nickel, e.g. as part of the black copper from an upstream smelter step. This higher tolerance for nickel brings for the process according to the present invention, and for any process steps performed upstream, a wider window of acceptance with respect to raw materials. The process according to the present invention, as well as any of its upstream process steps, may thus accept raw materials that alternate processes known in the art may not accept, or only accept in very limited quantities, and which may thus be more readily available at economically more attractive conditions.

In spite of the higher tolerance for nickel, the applicants have also found that the process according to the present invention may be capable of producing a prime anode copper product that is richer in copper and comprises less nickel as compared to the anode copper produced in U.S. Pat. No. 3,682,623.

In an embodiment of the process according to the present invention, the black copper comprises at most 3.5% wt of iron, preferably at most 3.0% wt, more preferably at most 2.5% wt, even more preferably at most 2.0% wt, yet more preferably at most 1.80% wt, preferably at most 1.60% wt of iron.

Optionally the black copper comprises at least 0.1% wt of iron, preferably at least 0.2% wt, more preferably at least 0.5% wt of iron. The applicants have found that this iron promotes the reactions in step f) and/or o) because it readily reacts in step f) and/or step o) to form an iron oxide by removing at least one oxygen atom from an oxide of a metal having a lower affinity for oxygen than iron under the conditions of the process step, such as tin and/or lead.

In an embodiment of the process according to the present invention, the black copper comprises at most 8.0% wt of zinc, preferably at most 7.5% wt, more preferably at most 7.0% wt, even more preferably at most 6.5% wt, yet more preferably at most 6.0% wt, preferably at most 5.5% wt, more preferably at most 5.0% wt, even more preferably at most 4.7% wt of zinc.

Optionally the black copper comprises at least 0.1% wt of zinc, preferably at least 0.2% wt, more preferably at least 0.5% wt of zinc. The applicants have found that this zinc promotes the reactions in step f) and/or o) because it readily reacts in step f) and/or step o) to form a zinc oxide by removing at least one oxygen atom from an oxide of a metal having a lower affinity for oxygen than zinc under the conditions of the process step, such as tin and/or lead.

The applicants have found that it is advisable to keep the concentrations of iron and/or zinc within the specified boundaries. These metals are typically oxidized in the copper refining steps, where they consume ancillaries. Zinc is readily reduced in any of the reducing steps of the process, and hence also there consumes ancillaries. In addition, these metals take up furnace volume. For these reasons, the applicants want to limit these metals to the respective concentrations as specified.

In an embodiment of the process according to the present invention, the first and/or second crude solder metal composition comprises at least 65% wt together of tin and lead, preferably at least 67% wt, more preferably at least 69% wt, even more preferably at least 70% wt, preferably at least 72% wt, more preferably at least 74% wt, preferably at least 75% wt, more preferably at least 76% wt, even more preferably at least 77% wt together of tin and lead. The applicants have found that a higher amount of tin and lead being present in the first and/or second crude solder metal composition allows for a higher volume of high purity tin and of high purity lead that may be recovered therefrom, products that are of high economic value.

In an embodiment of the process according to the present invention, the first and/or second crude solder metal composition comprises at least 5.0% wt of tin, preferably at least 7.5% wt, more preferably at least 10.0% wt, even more preferably at least 15.0% wt, preferably at least 17% wt, more preferably at least 19% wt, even more preferably at least 20% wt, preferably at least 21% wt, more preferably at least 22% wt of tin. The applicants have found that the more tin being present in the first and/or second crude solder metal composition, the higher the volume of high purity tin that may be recovered therefrom.

In an embodiment of the process according to the present invention, the first and/or second crude solder metal composition comprises at least 45% wt of lead, preferably at least 47.5% wt, more preferably at least 50% wt, even more preferably at least 52% wt, preferably at least 53% wt, more preferably at least 54% wt, even more preferably at least 55% wt of lead. The applicants have found that the more lead being present in the first and/or second crude solder metal composition, the higher the volume of high purity lead that may be recovered therefrom, i.e. commercial products that enjoy significant economic premiums. The lead further brings the advantage, in any phase separations occurring downstream during the further processing of the first and/or second crude solder metal composition, that the liquid metal streams comprising the lead have a higher density and therefore more readily separate by gravity from any supernatant slag or dross phase. A further advantage is that the feedstocks of the overall process are allowed to contain more lead, such that a wider variety of feedstocks become acceptable, bringing the benefit of a wider selection of possible feedstocks, possibly including feedstocks that are more abundantly available and at more attractive conditions.

In an embodiment of the process according to the present invention, the first and/or second crude solder metal composition comprises at most 26.5% wt together of copper and nickel, preferably at most 25.0% wt, more preferably at most 22.5% wt, even more preferably at most 20.0% wt, preferably at most 17.5% wt, more preferably at most 16.0% wt, even more preferably at most 15.5% wt together of copper and nickel, and optionally at least 1% wt together of copper and nickel, preferably at least 2% wt, more preferably at least 3, 4 or 5% wt together of copper and nickel. The applicants have found that having less copper and nickel in the first and/or second crude solder metal composition is advantageous. The first and/or second crude solder metal composition usually needs to be submitted to further purification steps to reduce the presence of metals other than tin, lead and antimony in the crude solder metal composition, e.g. before this crude solder metal composition becomes suitable for the recovery of high purity tin and/or lead products. This includes the removal of copper and nickel. Such a treatment may e.g. be with silicon metal such as described in DE 102012005401 A1. Silicon metal is a rather expensive process chemical, and the treatment results in silicon compounds of the contaminant metals as by-product that needs to be reworked or disposed of. The copper and nickel that are entrained in the first and/or second crude solder metal thus cause an increase of consumption of silicon metal in such a purification step. It is thus advantageous to limit the copper and nickel in the first and/or second crude solder metal composition in compliance with the prescribed upper limit(s).

In an embodiment of the process according to the present invention, the first and/or second crude solder metal composition comprises at most 17.5% wt of copper, preferably at most 15% wt, more preferably at most 14% wt, even more preferably at most 13% wt, preferably at most 12% wt, more preferably at most 11% wt of copper, and optionally at least 1% wt of copper, preferably at least 2% wt, more preferably at least 3, 4 or 5% wt of copper. For the reasons explained above for copper and nickel together, the applicants prefer to limit the copper in the first and/or second crude solder metal composition in compliance with the prescribed upper limit.

In an embodiment of the process according to the present invention, the first and/or second crude solder metal composition comprises at most 9.0% wt of nickel, preferably at most 7.0% wt, more preferably at most 5.0% wt, even more preferably at most 4.0% wt, preferably at most 3.0% wt, more preferably at most 2.0% wt of nickel, and optionally at least 1% wt of nickel, preferably at least 2% wt, more preferably at least 3, 4 or 5% wt of nickel. For the reasons explained above for copper and nickel together, the applicants prefer to limit the nickel in the first and/or second crude solder metal composition in compliance with the prescribed upper limit.

In an embodiment of the process according to the present invention, the first and/or second crude solder metal composition comprises at most 8% wt of iron, preferably at most 8.0% wt, more preferably at most 7.5% wt, even more preferably at most 7.0% wt, preferably at most 6.5% wt, more preferably at most 6.0% wt, even more preferably at most 5.5% wt, preferably at most 5.0% wt, more preferably at most 4.5% wt, even more preferably at most 4.0% wt, preferably at most 3.5% wt of iron, and optionally at least 0.2% wt of iron, preferably at least 0.4% wt, more preferably at least 0.5, 0.6 or 0.7% wt of iron. The applicants have found that having less iron in the first and/or second crude solder metal composition is advantageous. The first and/or second crude solder metal composition usually needs to be submitted to at least one further purification step to reduce the presence of metals other than tin, lead and antimony in the crude solder metal composition, e.g. before this crude solder metal composition becomes suitable for the recovery of high purity tin and/or lead products. This includes the removal of iron. Such a treatment may e.g. be with silicon metal such as described in DE 102012005401 A1. Silicon metal is a rather expensive process chemical, and the treatment results in a silicon compound of the contaminant metal as a by-product that needs to be reworked or disposed of. The iron that is entrained in the first and/or second crude solder metal thus causes an increase of consumption of silicon metal in such a purification step. It is thus advantageous to limit the iron in the first and/or second crude solder metal composition in compliance with the prescribed upper limit(s).

In an embodiment of the process according to the present invention, step (i) comprises the step of
b) partially oxidizing the first portion of the black copper composition, thereby forming a first enriched copper metal phase and a first copper refining slag, followed by separating the first copper refining slag from the first enriched copper metal phase.

The applicants have found that the partial oxidation of a black copper feedstock is highly effective for the production of a slag phase, i.e. the first solder refining slag, which slag is particularly suitable for the derivation of a crude solder stream, such as the first and/or second crude solder metal composition, which crude solder stream may then serve as an intermediate for the recovery of high purity tin and/or lead products.

In an embodiment of the process according to the present invention, the recovery of tin in step b) as part of the first copper refining slag, relative to the total amount of tin present in step b), is at least 20%, preferably at least 30%, more preferably at least 40.00%, even more preferably at least 45%, yet more preferably at least 50%, preferably at least 55%, more preferably at least 57%. No units need to be specified for the % recovery of a particular element, because regardless whether one considers atoms or weight, the % recovery remains the same.

In an embodiment of the process according to the present invention, the recovery of lead in step b) as part of the first copper refining slag, relative to the total amount of lead present in step b), is at least 20%, preferably at least 30.00%, more preferably at least 40%, even more preferably at least 45%, yet more preferably at least 50%, preferably at least 55%, more preferably at least 60%.

The specified lower limit on the recovery of tin and/or lead in step b) as part of the first copper refining slag brings the advantage that already in the first oxidation step which is performed on the black copper, a significant amount of the tin and/or lead present is removed, together with significant amounts of other elements other than copper. This brings the advantage that less impurities are fed to the steps performed downstream on the first enriched copper metal phase. This means that the downstream process steps on the first enriched copper metal phase have to cope with a lower amount of impurities, and also with less volume occupancy by the first enriched copper metal phase. This usually means that more precious furnace volume is liberated in the subsequent processing steps performed on the first enriched copper metal phase, which opens room for introducing extra material in these process steps, and hence the opportunity for an increased production of final copper product within the same furnace volume constraints. The listed advantages are associated with the lower limit on the recovery of tin in step b), also with the lower limit on the recovery of lead in step b), and on a combination of a lower limit on the recovery of tin with a lower limit on the recovery of lead in step b). The effects are cumulative with respect to the two metals tin and lead, and together bring even an enhanced effect relative to the sum of the two individual effects.

The applicants have found that the desired recoveries in step b) may be obtained by controlling the presence of oxygen and/or oxygen donors in step b) within appropriate limits, if needed combined with a controlled addition of scavengers for oxygen, and the addition of flux material.

In an embodiment of the process according to the present invention, extra raw materials are added as fresh feed to step b). The applicants prefer to add raw materials containing solid metal because the melting of this solid metal is able to absorb a part of the reaction heat and assists in keeping the temperature of the furnace within the preferred range. The applicants prefer to use for this purpose raw materials that are rich in copper and which may contain at least minor amounts of Sn and/or Pb. The preferred temperature range is delimited by a lower limit below which the viscosity of at least one of the liquid phases becomes excessively high for the furnace to operate. The preferred temperature range is delimited by an upper limit above which the volatility of valuable metals, in particular of tin and/or lead, becomes excessive and the recovery of these metals as part of the furnace dust becomes excessively troublesome, complex and expensive.

In an embodiment of the process according to the present invention, step (i) further comprises the step of c) partially reducing the first copper refining slag thereby forming a first lead-tin based metal composition and a first spent slag, followed by separating the first spent slag from the first lead-tin based metal composition, the latter forming the basis for a first liquid bath.

The applicants have found that a slag obtained from copper refining represents a highly suitable feedstock for obtaining by means of a partial reduction such as in step c) a metal composition that contains copper together with at least one solder metal selected from tin and lead and which metal composition is highly suitable for forming the basis for the first liquid bath as feedstock for partial oxidation step d), which is introduced further in this document. The reason for this is that a slag obtained from the metallurgical refining of copper contains copper together with at least one of the solder metals tin and lead, typically with both tin and lead. The applicants have found that most of the copper, which is coming with the first copper refining slag, in step c) will end up as part of the first lead-tin based metal composition forming in step c). The copper ending up in the first lead-tin based metal composition helps as a solvent for the tin and/or lead present in process step c). The copper present in step c) thus helps keeping the tin and/or lead in the metal phase of step c), i.e. the first lead-tin based metal composition, and reduces the amounts of tin and/or lead that may find their way into the first spent slag from step c), and thus may be lost from the process.

The applicants have further found that the inclusion of step c) in the process according to the present invention brings several additional benefits. Step c) of the process according to the present invention is a reduction step. Its purpose is to selectively reduce those metals in the furnace having under the process conditions a lower affinity for oxygen, into their respective metals. These reduced metals may then be separated off as a liquid metal phase, the separation leaving a liquid slag phase that is less concentrated in those metals, but still contains metals and elements that have a higher affinity for oxygen. In the context of the present invention, the purpose of step c) is preferably to selectively recover most of the copper from the first copper refining slag as copper metal, together with as much as possible of the tin and/or lead present. The reduction in step c) is thus preferably operated such that the first spent slag comprises at most 20% wt total of copper, tin and lead together. Preferably, the first spent slag comprises less than 20% wt total of copper, tin and lead together, more preferably even much less. Highly preferably the amounts of copper, tin and/or lead in this slag are sufficiently low such that they would not anymore represent an economically significant value. Most preferably, the concentrations of copper, tin and/or lead are sufficiently low such that the first spent slag would not cause environmental concerns when being disposed of as such, or may be acceptable for disposal after only limited further treatment.

In the first spent slag of step c) are preferably retrieved most of the elements that under the process conditions have a higher affinity for oxygen than tin and/or lead. This is particularly valid for metals such as iron, aluminium, sodium, potassium, calcium and other alkali and earth-alkali metals, but also for other elements such as silicon or phosphorus.

The applicants have found that the process according to the present invention including step c) preferably produces a first lead-tin based metal composition that is highly suitable for further processing, in particular for producing the first and/or the second crude solder metal composition that may have commercial value by itself and/or be suitable for recovery of tin and/or lead products of higher and commercially acceptable purity.

The applicants have surprisingly found that it is possible in step c) of the process according to the present invention to obtain a fairly clear separation between the valuable metals copper, nickel, tin and lead in the metal phase, and lower value metals such as iron and aluminium, and other elements such as silicon in the slag phase. This allows for a very high recovery of the valuable metals while producing a slag phase that is very low in these metals and hence may be discarded, either directly or with relatively minor further treatment. The applicants believe that this clear separation is possible because the presence of copper in step c) as part of the overall furnace content is within a particular concentration window. On the one hand, the copper acts as an extracting agent for tin and lead from the slag phase. On the other hand, the copper presence is sufficiently low such that the loss of copper in the slag phase is very limited.

Another major advantage is that the process according to the present invention including step c) has become much more tolerant to elements other than copper, most of which being elements that have under the process conditions a higher affinity for oxygen than copper, tin and lead, and hence end up as part of the first spent slag. This significantly widens the acceptability criteria for any raw materials that may additionally be fed to step b), i.e. besides the black copper. In addition, this also significantly relaxes the acceptance criteria for the black copper itself. This feature thus significantly widens the acceptability criteria for the raw materials that are used in the production of the black copper, usually in a smelter step. The smelter step is therefore allowed to accept much more low quality raw materials, which are more abundantly available at economically more attractive conditions.

Yet another advantage is caused by that in step b) the volume of slag is high relative to the total furnace content. Removal of the slag from the furnace thus liberates a significant part of the furnace volume, such that in the further processing of the first enriched copper metal phase obtained from step b), which usually is performed in the same furnace, extra room is created for introducing further extra raw materials.

The applicants have found that the further processing of the first lead-tin based metal composition from step c) may be operated much more effectively and also much more efficiently thanks to the upstream removal from the process, as part of the first spent slag, of at least a significant part of the metals and elements having under the process conditions a high affinity for oxygen. The applicants have found that this feature of the process brings significant benefits downstream of step b), in the processing of the first lead-tin based metal composition.

One major advantage is that the volume of material to be processed downstream is significantly reduced by the removal in step c) of a significant amount of material as the first spent slag, i.e. before the recovery of the solder metals (Sn and/or Pb). In further downstream steps, this material would be deadweight and bring primarily drawbacks rather than benefits. In the process according to the present invention including step c), the further processing of the first lead-tin based metal composition may be operated much more volume efficiently, meaning that either smaller equipment may be used, or the process according to the present invention including step c) creates opportunities for processing additional streams for which the known processes would have less or no room. In addition, energy consumption may be also reduced in these downstream process steps, because of the reduced volume of hot material that needs to be processed.

The applicants have further surprisingly found that, by removing the first spent slag from the process according to the present invention including step c), the separations in the pyrometallurgical process steps downstream, i.e. for processing the first lead-tin based metal composition, are also much improved. By having more clear separations between the respective metal phases and their corresponding slag phases, the downstream recovery of valuable metals may be operated more effectively and more efficiently, i.e. with higher prime product yields, lower discards of valuable metals, and requiring lower energy input, e.g. because of lower recycle stream volumes.

A further advantage of the process according to the present invention including step c), is that in the further processing of the first lead-tin based metal composition, extra materials may be introduced thanks to the extra furnace space made available by the removal of the high volume of the first spent slag from the process according to the present invention. Such extra materials may e.g. be rich in tin and/or lead. Such extra materials may e.g. be process slags and/or dross generated as by-products from downstream refining steps as part of the further purification of tin and/or lead streams into commercially valuable prime products.

Another and major advantage of the process according to the present invention including step c) is that it allows for a much higher amount of crude solder co-product for the same amount of copper that is being processed. The applicants have found that the crude solder co-production, relative to the amount of copper being processed in the first copper refining step, may be increased by about 29% when compared to the amounts obtained in the process described in U.S. Pat. No. 3,682,623. The economic value of crude solder, particularly as a possible intermediate for the production of a high purity tin product, is highly significant relative to the value of the anode copper prime product which may be obtained from the black copper. The increase in the relative amount of crude solder co-product relative to the amount of copper that is processed in the first copper refining step, therefore brings a significant economic advantage to the operator of the process according to the present invention.

The applicants have also found that it is advantageous that step c) takes only the first copper refining slag, and that any subsequent copper refining slags are better processed separately and preferably each in a different manner. The applicants have found that the first copper refining slag is the copper refining slag containing the highest total amount of elements other than copper, and particularly the elements having under furnace conditions a higher affinity for oxygen than copper, more particularly an affinity for oxygen that is higher than also tin and lead. The applicants have therefore surprisingly found that it is most effective to perform step c) on the first copper refining slag, i.e. before mixing in any of the other copper refining slags that are produced in process steps downstream of step b). The applicants have found that subsequent copper refining slags typically comprise higher concentrations of copper, and therefore the applicants prefer to process these downstream copper refining slags differently from the first copper refining slag.

In an embodiment of the process according to the present invention including step c), the total feed to step c) comprises at least 29.0% wt of copper, preferably at least 30.0% wt, more preferably at least 31.0% wt, even more preferably at least 32.0% wt, yet more preferably at least 33.0% wt, preferably at least 34.0% wt, more preferably at least 35.0% wt, even more preferably at least 36.0% wt, preferably at least 37.0% wt, more preferably at least 38.0% wt of copper.

In an embodiment of the process according to the present invention including step c), the total feed to step c) comprises an amount of copper that is at least 1.5 times as high as the total amount of solder metals present, i.e. the sum of Sn plus Pb, preferably at least 1.6 times, more preferably at least 1.7 times, even more preferably at least 1.8 times, yet more preferably at least 1.9 times, preferably at least 2.0 times, more preferably at least 2.1 times as high as the total amount of solder metals present.

The applicants have found that the prescribed amount of copper brings the advantage that there is sufficient copper present to act as a solvent for extracting solder metals from the slag phase into the first lead-tin based metal composition, and hence improves the recovery of valuable tin and/or lead from the slag in step c).

The applicants have found that the lower limit specified for the presence of copper, relative to the presence of the sum of Sn plus Pb present, in the total feed to step c) brings the advantage that a better extraction of Sn and Pb is obtained from the slag phase, and this without introducing significant amounts of copper in the slag phase. The applicants have found that the high presence of copper in the feed to step c) affects the equilibria for tin and lead between the slag and the metal phases at the end of step c), favouring the move of these solder metals from the slag phase into the metal phase. The applicants have found that this effect may be achieved without increasing the concentration of copper in the spent slag obtained from step c) up to economically significant and possibly unacceptable levels. The applicants have found the high amount of copper in the feed to step c) allows to obtain a spent slag from step c) which contains only low concentrations of tin and/or lead, as well as copper. This brings the advantage that the spent slag from step c) requires less further treatment, if any at all, for its responsible disposal or for its use in a suitable downstream application.

In an embodiment of the process according to the present invention including step c), step c) comprises adding a first reducing agent to step c) preferably by adding the agent to the first copper refining slag before reducing the first copper refining slag. The applicants have found that the addition of the reducing agent assists in achieving the desired chemical reduction. The applicants have found that the first reducing agent may possibly be a gas, such as methane or natural gas, but may also be a solid or a liquid, such as carbon, a hydrocarbon, even aluminium or iron.

In an embodiment of the process according to the present invention including step c), the first reducing agent comprises, and preferably is, a metal having under the process conditions a higher affinity for oxygen than tin, lead, copper and nickel, preferably iron metal, more preferably scrap iron. The applicants prefer to use iron, preferably scrap iron as the reducing agent, because of its high availability at economically very attractive conditions. The applicants have found that the addition of the solid reducing agent may bring the additional benefit that the furnace requires less additional heating in order to maintain or reach its desired temperature. The applicants have found that this benefit may be sufficiently large that additional heating by burning a fuel using air and/or oxygen may hardly be required in order to reach the desired temperature. The applicants have further found that step c) may further benefit from the addition of silica, as explained elsewhere in this document.

In an embodiment of the present invention, the process further comprises the step of g) recycling at least a part of the second lead-tin based metal composition to step c), preferably adding most if not all of the second lead-tin based metal composition to step c), and preferably before reducing the first copper refining slag, and/or recycling at least a part of the second lead-tin based metal composition to step b) and/or recycling at least a part of the second lead-tin based metal composition to step d) which is introduced further below in this document.

The applicants have found that the valuable metals in the second lead-tin based metal composition from step f) may readily be recovered by adding this composition to step c) and/or step b) and/or step d). The metals in the second lead-tin based metal composition having a higher affinity for oxygen under the process conditions, readily oxidize and result in a reduction of those metals being fed to step c) that have a lower affinity for oxygen under the same conditions. The presence in step c) of the extra metals from step f) result in a partial reduction of the metals present as oxides in the first copper refining slag. As a result, more valuable metals, such as Cu, Ni, Sn, Pb, Sb, As, move into the metal phase of step c), and more rejectable metals, such as Fe, Si and Al, move into the first spent slag produced in step c). The addition of this second lead-tin based metal composition into step c) therefore improves the desired separation of the other feedstocks to step c) in combination with obtaining a desired separation of the metals that have been recovered from step f).

In an embodiment of the process according to the present invention, step (i) further comprises the step of d) partially oxidizing the first liquid bath, thereby forming a first dilute copper metal composition and a first solder refining slag, followed by separating the first solder refining slag from the first dilute copper metal composition.

The applicants have found that step d) is highly suitable for concentrating a major amount of the solder metals, i.e. tin and/or lead, present in the first liquid bath, into the first solder refining slag without having to entrain a significant portion of the copper, and possibly also nickel, present in the first liquid bath, and this by at the same time recovering a metal stream that contains most of the copper and nickel present in the first liquid bath without having to entrain significant amounts of metals that have a higher affinity for oxygen than tin and/or lead under the conditions of step d). In particular, the step d) removes most of the copper and nickel, if present, as part of the first dilute copper metal composition, and thereby produces a slag phase that contains only low amounts of copper and/or nickel but relatively high amounts of tin and/or lead, together with most of the metals having under the process conditions an even higher affinity for oxygen than lead and/or tin. On the other hand, the step d) produces a metal stream that is highly suitable for recovery of its metal content because it is rich in valuable metals with very little dilution with metals of little or no value.

The applicants have found that the generation of the first dilute copper metal composition in step d) offers a major advantage in obtaining a relatively clear separation between on the one hand copper into a high purity copper stream, potentially even up to anode quality, and on the other hand a crude solder stream such as the first crude solder metal composition obtained in step e) which is introduced further below in this document. Any elemental copper in step d) acts in step d) as an extracting agent for the tin and/or lead, but also upstream The copper therefore acts as a carrier for the tin and/or lead. Entraining in steps b) and/or h), step h) being introduced further below in this document) some of the copper into the respective slag phases helps in removing more tin and/or lead from the main copper process stream which passes as a metal stream through the copper refining process steps b) and/or h), on its way to become a prime copper product stream sufficiently rich for further processing into a high purity copper product. The copper also helps as a solvent for the tin and/or lead in process step c). The copper in step c) thus helps keeping the tin and/or lead in the metal phase of step c), i.e. the first lead-tin based metal composition, and reduces the amounts of tin and/or lead that may find their way into the first spent slag from step c).

The applicants have further found that the oxidation step d), thanks to the production of the first dilute copper metal composition as the metal phase, is able to produce a first solder refining slag which is richer in tin and/or lead, particularly in tin and lead together, relative to the amount of copper that is entrained with that first solder refining slag. Because the first solder refining slag is enriched in tin and/or lead, this facilitates the downstream recovery of the solder metals (i.e. tin and/or lead) from this first solder refining slag.

The applicants have also found that the generation of the first dilute copper metal composition in step d) offers the further advantage that more tin and/or lead may be introduced with the raw materials. This significantly widens the acceptability criteria for any raw materials that may additionally be fed to step b), i.e. besides the black copper, but also in the steps downstream thereof, such as in steps h), c) and d), and in step j) which is introduced further below in this document. In addition, this also significantly relaxes the acceptance criteria for the black copper itself. This feature thus significantly widens the acceptability criteria for the raw materials that are used in the production of the black copper, usually obtained as the main product from a smelter step. The smelter step is therefore allowed to accept much more low quality raw materials, which are more abundantly available at economically more attractive conditions.

The applicants have further found that the generation of the first dilute copper metal composition brings the further advantage that in step d) a better separation may be obtained between the copper and nickel intended to go into the first dilute copper metal composition, and the tin and lead intended for going into the first solder refining slag.

The applicants have found that the performance of step c) upstream of, or before, step d) allows to achieve in step d) a favourably high recovery of the copper and/or nickel in step d) into the metal product, and having only a relatively low amount of copper and/or nickel, if present, into the first solder refining slag.

The amounts of copper and/or nickel ending up as contaminants in the crude solder, represent, together with the iron present, a burden for the crude solder refining process, in particular when this is done using silicon metal, and are thus undesired. The applicants have found that downstream of step d), a crude solder metal may be produced that contains significantly less than the 18.11% wt of copper, nickel and iron together in U.S. Pat. No. 3,682,623.

The applicants have further found that the first dilute copper metal phase which is recovered from the slag retreatment furnace may contain much less non-valuable metals. In U.S. Pat. No. 3,682,623, the black copper for recycle (Table XIV) contains only 97.52% wt of the total of Cu, Sn, Pb and Ni, leaving 2.48% wt as the balance. This difference brings the advantage that the first dilute copper metal phase becomes much easier for being processed further, especially for the recovery of the valuable metals the stream contains.

The applicants have further found that the first dilute copper metal phase which is recovered from step d) may contain relatively important amounts of tin and/or lead. This brings the advantage that the corresponding slag phase obtained from step d), i.e. the first solder refining slag which if allowed sufficient time and mixing should be in equilibrium with the first dilute copper metal phase, is also richer in tin and/or lead. As a result, more tin and/or lead becomes available for recovery downstream by the further processing of the first solder refining slag for the recovery therefrom of the solder metals, i.e. the tin and/or lead. The overall result is that more crude solder may be produced relative to the amount of copper that is produced from the process according to the present invention. This benefit brings the associated extra advantage that a significantly higher amount of high purity tin product may be produced relative to the copper production rate of the process according to the present invention. Because the co-production of tin generates an additional revenue above the copper production revenues, this advantage may be of significant economic benefit to the process operator.

The applicants have further found that the more significant presence of tin and/or lead in the first dilute copper metal phase which is recovered from step d) makes it technically more readily possible, and economically also more interesting, to recover from this stream the tin and/or lead by processing this stream separately, rather than simply recycling this stream as such to the first copper refining step b), as is done in U.S. Pat. No. 3,682,623. The applicants found that the first dilute copper metal phase or composition which may be obtained from step d), is now highly suitable for further being separated in a stream more concentrated in tin and/or lead on the one hand, and a stream more concentrated in copper and/or nickel on the other hand. The generation of another stream more concentrated in tin and/or lead brings about the possibility to generate even more higher purity tin by-product relative to the copper production, which adds to the advantages discussed hereinabove on that subject. Even if, subsequently to that additional separation, at least a part of the stream more concentrated in copper and/or nickel would be recycled to the first copper refining step b), similar to what happened in U.S. Pat. No. 3,682,623, there would then be less tin and/or lead in that recycle relative to the copper content, and hence more furnace volume becomes available for processing extra fresh feeds in the steps through which this recycle would be passing.

The applicants have also found that the process including step d) is highly effective for the production of a slag phase, i.e. the first solder refining slag, which slag is particularly suitable for producing a derivative crude solder stream, which may serve as an intermediate for the recovery of high purity tin and/or lead products. The applicants have found that this effectiveness is particularly due to the obtaining, in step d), of the first dilute copper metal composition, but also because of the sequence of oxidation and reduction steps as specified in the process according to the present invention.

In an embodiment, the process according to the present invention comprises the addition of a fresh feed to the furnace charge of step d). The applicants have found that step d) is highly suitable for recovering valuable metals from their oxides. The copper, tin and/or lead added as part of fresh feed to step d) in an oxide form may readily be recovered as elemental metal in the metal phases formed in step d), e) or f) under the process conditions. Step e) is introduced further below in this document. The applicants have found that step d) is therefore suitable for recycling e.g. volumes of an end slag containing particular metals above desirable levels, and hence economically or ecologically less suitable for disposal, or volumes of slag layers that have collected as a crust that may grow on the inside of containers used for transporting molten slags from one process step to another. The applicants have found that adding such materials as fresh feed to step d) allows for an improved recovery of the valuable metals therein.

In an embodiment of the process according to the present invention, the temperature of the slag in step b) and/or in step c) is at least 1000° C., preferably at least 1020° C., more preferably at least 1040° C., even more preferably at least 1060° C., preferably at least 1080° C., more preferably at least 1100° C., even more preferably at least 1110° C., preferably at least 1120° C., more preferably at least 1130° C., even more preferably at least 1140° C., preferably at least 1150° C. The applicants have found that the separation between the metal phase and the slag phase is better when the temperature of the slag is in compliance with the prescribed limit, and preferably above the prescribed limit. Without wanting to be bound by this theory, the applicants believe that the higher temperature brings a better separation at least because the viscosity of the slag is lower at higher temperatures. A lower slag viscosity allows the heavier metal bubbles to combine faster into larger bubbles and to sink faster through the slag phase until they reach the underlying metal phase and may combine therewith. A higher temperature also brings the advantage of faster reaction kinetics, such that a desired equilibrium may be reached faster.

The applicants however also believe that the equilibrium between metal and slag phase is affected by the temperature. Usually a higher temperature tends to decrease the differences between different metals in terms of their affinity for oxygen under the process conditions. The applicants therefore prefer to limit the furnace temperature in step b) and/or c) to at most 1300° C., preferably at most 1250° C., more preferably at most 1200° C. The applicants prefer to apply this limit to most, if not all of the steps in the process according to the present invention in which there is made a phase separation between at least two liquid phases, usually a supernatant slag phase and an underlying metal phase.

At the high temperatures in a non-ferrous metal smelting or refining step, the metals and the metal oxides are both occurring in a liquid molten state. The metal oxides usually have a lower density than the metals and form a separate so-called "slag" phase which comes floating as a supernatant liquid phase on top of the molten metal phase. The metal oxides may thus be separated by gravity as a separate liquid slag phase from the molten metal phase. Silica, usually in the form of normal sand, may be added as a so-called "flux material", i.e. as a slag diluent and/or for improving the slag fluidity such that it separates more readily from the metal phase and it is easier to handle. The silica is also capable of binding particular elements, and thereby also affects the desire of that element to become part of the slag phase rather than the metal phase. The applicants have found that the addition of silica is a highly desirable process element for many of the steps that are part of the process according to the present invention where a slag phase and a metal phase are to be separated from each other, because the silica in many circumstances assists in changing the equilibrium between the metal phase and the slag phase in the favour of the separation that is desired with respect to the metals desired in the metal phase and the metals preferred to stay in the slag phase. The applicants have further found that when the slag contains iron and is withdrawn from the furnace and granulated by contacting the hot liquid slag with water, the addition of silica may avoid the risk that the iron is present in a form which acts as a catalyst for the splitting of water and hence the formation of hydrogen gas, which represents an explosion hazard. Silica also increases the activity of any tin in the slag, forcing some $SnO_2$ to reduce to Sn metal, which Sn will move to the metal phase. This last mechanism reduces the amount of Sn that remains in the slag for the same underlying metal composition.

At the operating conditions of pyrometallurgy, several chemical reactions take place between the various metals and oxides in the furnace. The metals having a higher affinity for oxygen are more readily oxidized and those oxides tend to move into the slag phase, while the metals having a lower affinity for oxygen, when present as oxides, readily reduce to return to their metal state and these metals tend to move into the liquid metal phase. If sufficient contacting surface and time is allowed, an equilibrium establishes between the metal phase, in which the metals having a lower affinity for oxygen under the process conditions collect, and the slag phase, in which the metals having a higher affinity for oxygen under the process conditions are collecting in the form of their oxides.

Metals such as sodium (Na), potassium (K), calcium (Ca) and silicon (Si) have an extremely high affinity for oxygen and will almost exclusively be retrieved in the slag phase. Metals such as silver (Ag), gold (Au) and other precious metals have an extremely low affinity for oxygen, and are almost exclusively retrieved in the metal phase. Most other metals typically behave "in-between" these two extremes, and their preference may in addition be affected by the presence of other elements or substances, or maybe the relative absence thereof.

The metals of interest for this invention have, under the typical furnace conditions of non-ferrous metal refining, affinities for oxygen, and will tend to distribute between the metal and the slag phase. From lower to higher affinity for oxygen, and hence from a relatively high affinity to a lower affinity for the metal phase, the ranking of these metals may be represented roughly as follows: Au>Ag>>Bi/Cu>Ni>As>Sb>Pb>Sn>>Fe>Zn>Si>Al>Mg>Ca. For convenience, one may call this a ranking of the metals from the more noble to the less noble, but this qualification has to be linked to the particular conditions and circumstances of non-ferrous metal pyrometallurgical processes, and may fail when exported into other fields. The relative position of particular metals in this list may a.o. be affected by the presence or absence of other elements in the furnace, such as e.g. silicon.

The equilibrium distribution of metal between metal and slag phase may also be influenced by adding oxygen and/or oxygen scavenging materials (or reducing agents) into the liquid bath in the furnace.

Oxygen addition will convert some of the metals in the metal phase into their oxidised form, which oxide will then move into the slag phase. The metals in the metal phase which have a high affinity for oxygen will be more prone for undergoing this conversion and move. Their equilibrium distribution between metal and slag phase may thus be more subject to change.

The opposite may be obtained by adding oxygen scavenging materials. Suitable oxygen consumers may for instance be carbon and/or hydrogen, in whatever shape or form, such as in organic materials, e.g. wood, or other combustibles, such as natural gas. Carbon and hydrogen will readily oxidize ("burn") and convert to $H_2O$ and/or $CO/CO_2$, components that readily leave the liquid bath and entrain its oxygen content from the bath. But also metals such as Si, Fe, Al, Zn and/or Ca are suitable reducing agents. Of particular interest are iron (Fe) and/or aluminium (Al), because of their ready availability. By oxidizing, these components will reduce some of the metals in the slag phase from their oxidized state into their metal state, and these metals will then move into the metal phase. Now it are the metals in the slag phase which have a lower affinity for oxygen that will be more prone for undergoing this reduction reaction and for making the move in the opposite direction.

In a smelter step, one of the purposes is to reduce oxides of valuable non-ferrous metals that are coming in with the feed into their corresponding reduced metals. The direction and speed of the reactions occurring in the smelter step may additionally be steered by controlling the nature of the atmosphere in the furnace. Alternatively or in addition, oxygen donating material or oxygen scavenging material may be added to the smelter.

A highly suitable oxygen scavenging material for such operations is iron metal, usually scrap iron being preferred. Under the typical operating conditions, the iron will react with hot oxides, silicates and the other compounds of metals having a lower affinity for oxygen than iron, to yield a melt containing the latter metals in elemental form. Typical reactions include:

$$MeO + Fe \rightarrow FeO + Me + heat$$

$$(MeO)_xSiO_2 + xFe \rightarrow (FeO)_xSiO_2 + xMe + heat$$

The temperature of the bath remains high through the exothermic heat of reaction and the heat of combustion. The temperature may readily be kept within a range in which the slag remains liquid and volatilization of lead and/or tin remains limited.

Each of the reduction reactions taking place in the melting furnace form an equilibrium. Thus, the conversion realized through each reaction is limited by the equilibria defined in relationships such as the following:

$$K1 = \frac{[FeO][Me]}{[MeO][Fe]}$$

$$K2 = \frac{[(FeO)_xSiO_2][Me]^x}{[(MeO)_xSiO_2][Fe]^x}$$

The parameters in these formulae are representing the activities of the mentioned chemical components under the operating conditions, often being the multiplication of the concentration of the component times the activity coefficient of the component under the operating conditions, whereby the latter is not always equal to 1.0 or the same for different components. The applicants have found that the activity coefficients may be influenced by the presence of other chemical compounds, such as so-called flux compounds, sometimes also called slag formers, in particular by the addition of silicon dioxide.

In the case where Me is copper, K1 and K2 are high at normal reaction temperatures and reduction of copper compounds thus proceeds substantially to completion. In the case of lead and tin, K1 and K2 are both relatively low, but the copper in the metal phase extracts metallic lead and tin from the slag reaction zone, thereby lowering the activities of these metals in the slag and driving the reduction of combined lead and tin to completion.

The vapour pressure of zinc is relatively high at the typical reaction temperature and a major proportion of zinc, in contrast to lead and tin, may readily be volatilized out of the furnace. Zinc vapours leaving the furnace are oxidized by air which may e.g. be aspirated between the furnace mouth and the hood and/or the exhaust pipe. The resultant zinc oxide dust is condensed and collected by means of conventional dust collecting systems.

Preferably, the copper, tin and lead content of the slag in the smelter furnace are each reduced to 0.5% wt or less. For that purpose, the metal phase should contain sufficient copper to act as the solvent for extracting the lead and tin present from the slag. Also for this reason, the applicants prefer the copper concentration in the black copper fed to the process according to the present invention to be above the lower limit specified elsewhere in this document.

In an embodiment, step (ii) of the process according to the present invention further comprises the following step:
e) partially reducing the first solder refining slag, thereby forming the first crude solder metal composition and the second solder refining slag, followed by separating the second solder refining slag from the first crude solder metal composition.

This step e) produces a crude solder stream rich in tin and/or lead, also containing most of the relatively small amounts of copper and/or nickel that were entrained in the first solder refining slag. The first crude solder stream is suitable for being further processed for further enrichment into tin and/or lead, e.g. by treatment with silicon metal as described in DE 102012005401 A1. Alternatively or in addition, this crude solder stream, optionally post an enrichment step for increasing the tin and/or lead content, may be further tuned as described in WO 2018/060202 A1 or similar, and subsequently be subjected to a distillation and recovery of the tin and/or lead as high purity metal products, as described in that same document.

The applicants have found that in step e) the recovery of the solder metals into the first crude solder metal composition may be advantageously high, and any entrainment of tin and/or lead, but also of any copper and/or nickel, into the second solder refining slag may be kept advantageously low.

In an embodiment of the process according to the present invention step e) comprises adding a second reducing agent to step e) preferably to the first solder refining slag before reducing the first solder refining slag. The applicants have further found that to perform the reduction in step e), in addition to the metal stream that may be added into step e) or as an alternative, a reducing agent may be added to step e). The applicants have found that the addition of the reducing agent assists in achieving the desired chemical reduction. The applicants have found that the second reducing agent may be a gas such as methane or natural gas, but may also be a solid or a liquid, such as carbon, a hydrocarbon, even aluminium or iron.

The applicants have found that the reduction in step e) may at least partially be performed by adding a suitable metal stream (second reducing agent), i.e. by the addition of a metal composition which contains metals having under the process conditions a higher affinity for oxygen than tin and/or lead, such as zinc, silicon, magnesium, iron, calcium or aluminium. This metal stream preferably in addition also contains tin and/or lead, and optionally may contain also some antimony and/or arsenic. This additional antimony, tin and/or lead readily ends up as part of the first crude solder metal composition from step e) and may readily be recovered downstream as part of a purified metal prime product. The added metal stream preferably contains only minor amounts of nickel and/or copper, i.e. metals which are likely to also end up as part of the first crude solder metal composition from step e) but which may bring extra process burdens and operating expenses, such as extra silicon consumption when a silicon treatment step is provided downstream in the refining of the first crude solder metal composition. Also iron is preferably present in only limited amounts, because not all of any added iron may end up in the slag phase, but rather leave step e) with the first crude solder metal composition, and increase the process burdens downstream.

In an embodiment of the process according to the present invention the second reducing agent comprises, and preferably is, a metal having under the process conditions a higher affinity for oxygen than tin, lead, copper and nickel, preferably the second reducing agent comprises iron metal, more preferably scrap iron. The applicants prefer to use iron, preferably scrap iron as the reducing agent, because of its high availability at economically very attractive conditions. The applicants have found that the addition of the solid reducing agent may bring the additional benefit that the furnace requires less additional heating in order to maintain or reach its desired temperature. The applicants have found that this benefit may possibly be sufficiently large that additional heating by burning a fuel using air and/or oxygen may be limited or even hardly be required in order to reach the desired temperature. The applicants have further found that the step e) may further benefit from the addition of silica, as explained elsewhere in this document.

In an embodiment of the process according to the present invention a first Pb and/or Sn containing fresh feed is added to step e), preferably the first Pb and/or Sn containing fresh feed comprising and preferably being dross obtained from downstream processing of concentrated streams of Pb and/or Sn.

The applicants have found that step e) is also a very suitable location in the process for introducing materials that are rich in tin and/or lead, yet poor in copper and nickel, but which may contain metals which under the process conditions have a higher affinity for oxygen than tin and lead. Their addition to step e) brings the advantage that the tin and/or lead are readily recovered as part of the first crude solder metal composition, and are withdrawn from the process, while the so-called "less noble" metals have a short and straight process pathway into the second spent slag produced in the downstream step f).

The applicants have found that step e) is very suitable for recovering tin and/or lead, and optionally antimony and/or arsenic, in raw materials or process by-products that are rich in such metals yet relatively low in copper and/or nickel. The applicants have found that the first Pb and/or Sn containing fresh feed may further contain metals having under the process conditions a higher affinity for oxygen than tin and/or lead, such as sodium, potassium, calcium. Such metals may e.g. be introduced as part of process chemicals used in downstream steps for refining a tin and/or lead rich stream such as the first crude solder metal composition or a downstream derivative. The applicants have found that step e) is very suitable for recovering valuable metals from a dross by-product formed in one of the refining steps performed as part of the processes disclosed in WO 2018/060202 A1 or similar. Such dross by-product streams typically entrain economically significant amounts of tin and/or lead, but also contain the other metals that may have been introduced as part of process chemicals.

In an embodiment of the process according to the present invention step (i) further comprises the step of
h) partially oxidizing the first enriched copper metal phase, thereby forming a second enriched copper metal phase and a second copper refining slag, followed by separating the second copper refining slag from the second enriched copper metal phase.

The applicants have found that the first enriched copper metal phase formed in step b) may be further enriched in copper by submitting the stream to a subsequent oxidation step. The subsequent oxidation step leads to the formation of a second copper refining slag which may contain economically significant amounts of valuable metals other than copper, but in which also an economically significant amount of copper is entrained.

In an embodiment of the process according to the present invention including step h), at least 37.0% wt of the total amount of the tin and lead that is processed through process steps b) and/or h) is retrieved in the first copper refining slag and the second copper refining slag together.

In an embodiment of the process according to the present invention including step h), at least 37.5% wt and better at least 38% wt of the total amount of the tin and lead that is processed through process steps b) and/or h) is retrieved in the first copper refining slag and the second copper refining slag together, preferably at least 40% wt, more preferably at least 45% wt, even more preferably at least 50% wt, preferably at least 60% wt, more preferably at least 70% wt, even more preferably at least 80% wt, yet more preferably at least 85% wt, preferably at least 90% wt, more preferably at least 92% wt, even more preferably at least 94% wt, yet more preferably at least 95% wt of the total amount of the tin and lead that is processed through process steps b) and/or h). The applicants have found that a high recovery of the tin and/or lead into the early slags of the copper refining step sequence is advantageous for obtaining a better separation between the copper on the one hand and the solder metals tin and/or lead on the other hand.

In an embodiment of the process according to the present invention, at least 8.5% wt of the total amount of the tin and lead that is processed through process step b) is retrieved in the first copper refining slag, preferably at least 10% wt, more preferably at least 15% wt, even more preferably at least 20% wt, preferably at least 30% wt, more preferably at least 40% wt, even more preferably at least 45% wt, yet more preferably at least 50% wt, preferably at least 55% wt, more preferably at least 60% wt, even more preferably at least 64% wt, yet more preferably at least 68% wt of the total amount of the tin and lead that is processed through process step b). The applicants have found that the earlier in the sequence of the copper refining steps b) and h) that more of the tin and/or lead is oxidized and moved into the copper refining slag phase, the clearer the overall separation between the copper on the one hand and the solder metals on the other hand can be made.

In an embodiment of the process according to the present invention including step h), at least 41.0% wt of the total amount of the tin that is processed through process steps b) and/or h) is retrieved in the first copper refining slag and the second copper refining slag together, preferably at least 45% wt, more preferably at least 50% wt, even more preferably at least 55% wt, preferably at least 60% wt, more preferably at least 65% wt, even more preferably at least 70% wt, preferably at least 75% wt, more preferably at least 80% wt, yet more preferably at least 85% wt, preferably at least 90% wt, more preferably at least 92% wt of the total amount of the tin that is processed through process steps b) and/or h).

In an embodiment of the process according to the present invention including step h), at least 34.5% wt of the total amount of the lead that is processed through process steps b) and/or h) is retrieved in the first copper refining slag and the second copper refining slag together, preferably at least 35% wt, more preferably at least 40% wt, even more preferably at least 45% wt, even more preferably at least 50% wt, more preferably at least 55% wt, preferably at least 60% wt, yet more preferably at least 65% wt, more preferably at least 70% wt, more preferably at least 75% wt, even more preferably at least 80% wt, yet more preferably at least 85% wt, preferably at least 90% wt, more preferably at least 91% wt of the total amount of the lead that is processed through process steps b) and/or h)

In an embodiment, the process according to the present invention further comprises the step of
i) adding at least a part of the second copper refining slag to the first liquid bath and/or adding at least a part of the second copper refining slag to step d).

The applicants have found that the composition of the second copper refining slag is highly suitable for being added into the first liquid bath. The applicants therefore prefer to add all of the second copper refining slag into the first liquid bath. The stream is suitable in the first place because the second copper refining slag is already relatively rich in the valuable metals of interest tin and lead, but also includes significant amounts of copper which may act downstream as an extracting agent for non-copper metals such as tin and lead. In the second place, the second copper refining slag contains only low amounts of metals having under the process conditions a higher affinity for oxygen than tin and/or lead, more particularly metals that are less desired in the final purified metal products copper, tin and/or lead, and which metals will have to be removed from the process as part of a spent slag. Because the second copper refining slag is relatively poor in such metals, the addition of this slag into the first liquid bath does not consume high useless furnace volume in any of the downstream steps in the process sequence d), e) and f), i.e. the preferred process path for such "less noble" metals for ending up in a spent slag, in this case the second spent slag.

The applicants have found that the process according to the present invention including steps b), h), c), i) and d) is highly effective for the production of a slag phase, i.e. the first solder refining slag, a slag which is particularly suitable for producing a derivative solder stream, i.e. the first crude solder metal composition, which may serve as an intermediate for the recovery of high purity tin and/or lead products. The applicants have found that this effectiveness is particularly due to the obtaining, in step d), of the first dilute copper metal composition, but also because of the sequence of oxidation and reduction steps as specified.

The applicants have further found that the process according to the present invention including steps i) and d) is also highly energy efficient. In step d), the second copper refining slag which may be added in step i) acts as an oxidant for impurities in the first liquid bath. The copper oxides in the second copper refining slag readily reduce to elemental copper in that bath, thereby releasing the oxygen and making that oxygen available for converting those metals which are having under the process conditions a higher affinity for oxygen than copper, from their elemental metal form into oxides. The elemental copper formed in step d) therefore moves to the metal phase and leaves step d) with the first dilute copper metal composition. The metals that convert to their oxides in step d) will move to the slag phase and be retrieved in the first solder refining slag. The applicants have found that in step d) a significant amount of Sn and/or Pb may be moved from the metal phase that is entered into the furnace towards the first solder refining slag that is present at the end of step d). The applicants have also found that these chemical conversions in step d), of copper oxides to elemental copper and of tin, lead or other metals into their oxides, may be achieved with relatively little extra input of energy, external oxidants and/or reductants, and hence with a relatively limited consumption of energy or input of process chemicals.

In an embodiment, the process according to the present invention further comprises the steps of
j) partially oxidizing the second enriched copper metal phase, thereby forming a third enriched copper metal phase and a third copper refining slag, followed by separating the third copper refining slag from the third enriched copper metal phase, the third enriched copper metal phase preferably forming the refined copper product obtained in step (i),
k) adding at least a part of the third copper refining slag to the first dilute copper metal composition, thereby forming a second liquid bath and/or adding at least a part of the third copper refining slag to step l),
l) partially oxidizing the second liquid bath, thereby forming a first high-copper metal composition and a third solder refining slag, followed by separating the third solder refining slag from the first high-copper metal composition.

The applicants have found that the second enriched copper metal phase formed in step h) may be further enriched in copper by submitting the stream to the subsequent oxidation step j). The subsequent oxidation step leads to the formation of the third copper refining slag, which may still contain economically significant amounts of valuable metals other than copper, but in which also an economically significant amount of copper is entrained. The advantage is that these valuable non-copper metals become recoverable from the third copper refining slag in a much more simple manner as compared to the amounts of non-copper metals remaining in the third enriched copper metal phase if this stream would be subjected to a copper electrorefining step for the recovery of high purity copper in which the non-copper metals have a tendency to represent a process burden. Some non-copper metals remain during electrorefining in the so-called anode slime and some other non-copper metals dissolve in the electrolyte.

The applicants have further found that the three consecutive oxidation steps as part of the series b), h) and j) are able to produce, from a black copper starting raw material which may be rather dilute in copper but rich in tin and/or lead, a third enriched copper metal phase which has a copper concentration which is highly suitable for further purification by electrorefining, hence may be called "anode grade". The applicants have found that the sequence of oxidation steps as specified is able, from a black copper of hardly more than 75% wt of copper to produce a third enriched copper metal phase which contains as much as 99.0% wt of copper. The applicants have further found that, together with processing of the black copper fed to step b), extra copper-containing raw materials may be processed through the specified sequence of oxidation steps.

The applicants have found that the composition of the third copper refining slag is highly suitable for being added into the second liquid bath. The applicants therefore prefer to add all of the third copper refining slag into the second liquid bath.

The stream is firstly suitable because the third copper refining slag still contains economically significant amounts of the valuable metals of interest tin and/or lead, but is also relatively rich in copper, which may be used as a useful extracting agent for non-copper metals such as tin and/or lead.

In the second place, the third copper refining slag contains very little amounts of metals having under the process conditions a higher affinity for oxygen than tin and/or lead, more particularly metals that are less desired in the final purified metal products copper, tin and/or lead, and which metals are preferably removed from the process according to the present invention as part of a spent slag. Because the third copper refining slag is very poor in such metals, the addition of this slag into the second liquid bath causes very little useless furnace volume to be consumed unnecessarily in any of the downstream steps in the process, including step l) but also in any of the downstream steps in the process path that such "less noble" metals need to follow before they are eventually ending up in a spent slag.

The applicants have further found that any further recovery of valuable metals from the second liquid bath, such as in step l), may be highly energy efficient because of the addition of at least a part of the third copper refining slag in step k). In step k), the third copper refining slag which is added into the second liquid bath upstream of any further metal recovery steps acts as an oxidant for impurities in the second liquid bath. The copper oxides in the third copper refining slag readily reduce to elemental copper in step l), thereby releasing the oxygen for converting metals having under the process conditions a higher affinity for oxygen than copper from their elemental metal form into oxides. The elemental copper formed in the processing of the second liquid bath in step l) therefore moves to the metal phase, in step l) being the first high-copper metal composition. The metals that convert to their oxides in step l) move to the slag phase, i.e. the third solder refining slag. The applicants have found that in step l) a significant amount of Sn and/or Pb may be moved from the metal phase being fed, towards the slag phase. The applicants have also found that these chemical conversions in step l), of copper oxides to elemental copper and of tin, lead and/or other metals into their oxides, may be achieved with relatively limited extra input of energy, external oxidants and/or reductants, and hence with relatively limited consumption of energy or input of process chemicals.

The applicants have found that in step l), most of the copper and nickel present in the first dilute copper metal composition as well as in the third copper refining slag may be recovered in the first high-copper metal composition, together with some of the bismuth and antimony that may be present, while most of the tin and/or lead in those streams may be recovered in the third solder refining slag. The applicants have found that the third solder refining slag may become advantageously rich in tin and/or lead and also relatively lean in copper, such that this slag may be relatively easily further processed for recovery of most of its solder metals into a stream that resembles a crude solder stream and is suitable for being processed as a crude solder stream.

In an embodiment of the process according to the present invention including steps b), h), c), d), j) and l), the first high-copper metal composition is at least partially recycled to a suitable location upstream in the process. Preferably this location is step b), but a portion of the recycled stream may be recycled to step h) and/or step j) and/or step c) and/or step d).

The applicants have found that on the one hand the step l) is also highly suitable for providing a path for the removal of at least a part of the nickel from the overall foundry process, because any nickel being introduced at any upstream location into the process is likely to end up as part of the first high-copper metal composition. The applicants have found on the other hand, that if no or only a low amount of nickel is introduced with the feeds into the overall process, that the first high-copper metal composition has a composition which is highly comparable to the black copper feed provided in step a), that therefore this first high-copper metal composition stream may readily be recycled to step b), or alternatively and/or in addition partially to any one of the subsequent copper oxidation steps h) and j), for the recovery of its copper as part of the third enriched copper metal phase. The process described in U.S. Pat. No. 3,682,623 includes such a recycle of a copper-rich stream to the first oxidation step performed on the black copper. Any recycle of the first high-copper metal composition to the step b), or to one of the subsequent steps h) or j) however benefits in comparison to the prior art from the upstream removal of impurities into one of the spent slags, such as the first spent slag produced in step c) and/or the second spent slag produced in step f).

The applicants have found, if nickel is present in the feeds to the process, that a partial recycle of the first high-copper metal composition to an upstream location in the process, such as step b), h) or j), brings the advantage that nickel concentrates up to a higher level in the first high-copper metal composition, as compared to a process without such partial recycle. This concentration effect brings the advantage that the withdrawal of a particular amount of nickel from the process, e.g. in order to keep the levels of nickel in particular steps of the process below particular levels, requires a lower amount of copper to be withdrawn together with the amount of nickel. This brings the advantages that the removal of nickel from the process is more effective, that the further processing of the withdrawn copper/nickel mixture may be operated more effectively and in smaller equipment, and may also be operated more efficiently, i.e. with a lower consumption of energy and/or process chemicals.

The applicants have found that the first high-copper metal composition which is withdrawn from the process may be further processed for the recovery of copper and nickel contained therein by means that are known in the art, or by preference by the means described in the co-pending patent application EP-A-18172598.7 filed on 16 May 2018 and carrying the title "Improvement in Copper Electrorefining".

In an embodiment of the process according to the present invention including step l), at the end of step l) the first high-copper metal composition is only partially removed from the furnace, and a portion of this metal composition is kept in the furnace together with the third solder refining slag. This portion may represent at least 3% wt, 4% wt or 5% wt of the total of first high-copper metal composition present in the furnace at the end of step l), preferably at least 10% wt, more preferably at least 20% wt, even more preferably at least 30% wt, yet more preferably at least 40% wt of the total of first high-copper metal composition present in the furnace. The applicants have found that this amount of metal improves the operability of the furnace during the present and at least one of the subsequent process steps.

In an embodiment, the process according to the present invention further comprises the step of m) partially reducing the third solder refining slag, thereby forming a second dilute copper metal composition and a fourth solder refining slag, followed by separating the fourth solder refining slag from the second dilute copper metal composition.

The applicants have found that the third solder refining slag may contain amounts of copper and/or nickel that are still rather high for deriving a crude solder type stream from this slag. The applicants therefore prefer to include the additional partial reduction step m) as part of the process according to the present invention. The applicants have found that a significant amount of the copper and/or nickel present in the third solder refining slag may readily be removed as part of the second dilute copper metal composition formed in step m), while most of the tin and/or lead may be kept as part of the fourth solder refining slag, before subjecting the fourth solder refining slag to further processing. Preferably the step m) is operated such that at least 50% wt of the copper present in step m) is removed as part of the second dilute copper metal composition, more preferably at least 70% wt, even more preferably at least 80% wt, yet more preferably at least 90% wt. Alternatively or in addition, step m) is preferably operated such that at least 50% wt of the tin present in step m) is retrieved in the fourth solder refining slag, more preferably at least 70% wt, even more preferably at least 80% wt, yet more preferably at least 90% wt.

In an embodiment of the process according to the present invention including step m), at the end of step m) the second dilute copper metal composition is only partially removed from the furnace, and a portion of this metal composition is kept in the furnace together with the fourth solder refining slag. This portion may represent at least 1% wt, 2% wt, 3% wt, 4% wt or 5% wt of the total of second dilute copper metal composition present in the furnace at the end of step m), preferably at least 10% wt, more preferably at least 20% wt, even more preferably at least 30% wt, yet more preferably at least 40% wt of the total of second dilute copper metal composition present in the furnace. The applicants have found that this amount of metal improves the operability of the furnace during at least one of the subsequent process steps.

In an embodiment of the process according to the present invention, step (iii) further comprises the step of n) partially reducing the fourth solder refining slag, thereby forming the second crude solder metal composition and the fifth solder refining slag, followed by separating the second crude solder metal composition from the fifth solder refining slag.

The applicants have found that the fourth solder refining slag is a highly suitable feedstock for recovering a crude solder type material, highly acceptable for further processing into higher purity tin and/or lead prime products. The applicants have found that in the partial reduction step n), a high portion of the tin and/or lead present in the furnace may be recovered in the second crude solder metal composition, together with practically all of the copper and/or nickel present, while most of the metals having under the process conditions a higher affinity for oxygen, such as iron, may be retained as part of the fifth solder refining slag. The applicants have found that the second crude solder metal composition is suitable for being further processed, such as by subjecting the stream to a treatment with silicon metal as described in DE 102012005401 A1. Alternatively or in addition, this crude solder stream, optionally post an enrichment step for increasing the tin and/or lead content, may be further tuned as described in WO 2018/060202 A1 or similar, and subsequently be subjected to a distillation and recovery of the tin and/or lead as high purity metal products, as described in that same document.

In an embodiment of the process according to the present invention, the first solder refining slag and/or the fourth solder refining slag comprises at most 10.0% wt of copper, preferably at most 9.0% wt, more preferably at most 8.0% wt, even more preferably at most 7.0% wt, yet more preferably at most 6.0% wt of copper, preferably at most 5.5% wt, more preferably at most 5.0% wt, even more preferably at most 4.5% wt, preferably at most 4.0% wt, more preferably at most 3.5% wt, even more preferably at most 3.0% wt, preferably at most 2.5% wt, more preferably at most 2.0% wt, even more preferably at most 1.5% wt of copper, and optionally at least 0.1% wt, preferably at least 0.5% wt, more preferably at least 1.0% wt of copper. The applicants have found that the compliance with the upper limit brings the advantage of a more economical and possibly even simpler further refining of the crude solder stream that may be recovered downstream from the first solder refining slag and/or the fourth solder refining slag.

The applicants have found that having less copper in the first solder refining slag and/or the fourth solder refining slag also reduces the copper content of the first and/or second crude solder metal composition obtained in step e) and/or step n) because the copper is typically also reduced in step e) and/or step n) and most of the copper ends up as part of the resulting first and/or second crude solder metal composition. The first and/or the second crude solder metal composition usually needs to be submitted to further purification steps to reduce the presence of metals other than tin, lead and antimony in the crude solder metal composition, e.g. before this crude solder metal composition becomes suitable for the recovery of high purity tin and/or lead products. This includes the removal of copper. Such a treatment may e.g. be with silicon metal as described in DE 102012005401 A1. Silicon metal is a rather expensive process chemical, and the treatment results in a silicon compound of the contaminant metal as a by-product that needs to be reworked or disposed of. The copper entrained in the first and/or the second crude solder metal thus causes an increase of consumption of silicon metal in such a purification step. It is thus advantageous to limit the copper in the first solder refining slag and/or the fourth solder refining slag.

Preferably the first solder refining slag and/or the fourth solder refining slag comprises at least 1.0% wt of copper, more preferably at least 1.5% wt, even more preferably at least 2.0% wt, preferably at least 2.5% wt, more preferably at least 3.0% wt, even more preferably at least 3.5% wt of copper.

The applicants have also found that it is advantageous to tolerate some copper in the first solder refining slag and/or the fourth solder refining slag and to stay above the lower limit as specified. The applicants have found that this is to the benefit of the upstream process steps as well as to the benefit of the feedstocks that these upstream process steps are able to accept. At these levels, a higher presence of copper usually also means a higher presence of tin and/or lead, which may be highly advantageous. Both technical benefits represent advantages that balance the burden brought by the presence of copper in the first solder refining slag and/or the fourth solder refining slag, and as a result thereof, the presence of copper in the first and/or the second crude solder metal composition.

In an embodiment of the process according to the present invention, the first solder refining slag and/or the fourth solder refining slag comprises at least 2.0% wt of tin and optionally at most 20% wt of tin. Preferably the first solder refining slag and/or the fourth solder refining slag comprises at least 3.0% wt of tin, more preferably at least 3.5% wt, even more preferably at least 4.0% wt, preferably at least 4.5% wt, more preferably at least 5.0% wt, even more preferably at least 5.5% wt, preferably at least 6.0% wt, more preferably at least 6.5% wt, even more preferably at least 7.0% wt, preferably at least 7.5% wt, more preferably at least 8.0% wt, even more preferably at least 8.5% wt, preferably at least 9.0% wt, more preferably at least 9.5% wt, even more preferably at least 10.0% wt, preferably at least 10.5% wt, more preferably at least 11.0% wt of tin. The applicants have found that the more tin being present in the first solder refining slag and/or the fourth solder refining slag, the more tin may end up in the first and/or the second crude solder metal composition obtained downstream. Because high purity tin is a commercial product that enjoys a significant economic premium, a higher amount of tin in the first and/or the second crude solder metal composition allows for a higher volume of high purity tin that may be recovered therefrom.

Preferably the first solder refining slag and/or the fourth solder refining slag in the process according to the present invention comprises at most 19% wt of tin, more preferably at most 18% wt, even more preferably at most 17% wt, preferably at most 16% wt, more preferably at most 15% wt, even more preferably at most 14% wt, preferably at most 13% wt, more preferably at most 12% wt, even more preferably at most 11% wt of tin. The applicants have found that the compliance of the tin content with the specified upper limit brings the advantage that room is left for other metals which may bring advantages. In particular the presence of significant amounts of lead in the first solder refining slag and/or the fourth solder refining slag, a major part thereof ending up in the first and/or the second crude solder metal composition, brings the advantage that the crude solder metal composition has a higher density, which is highly beneficial in separations by gravity of the solder from other phases such as a slag phase or a dross, e.g. during further downstream refining of the crude solder metal composition.

In an embodiment of the process according to the present invention, the first solder refining slag and/or the fourth solder refining slag comprises at least 9% wt of lead and optionally at most 30% wt of lead. Preferably the first solder refining slag and/or the fourth solder refining slag comprises at least 10% wt of lead, more preferably at least 11% wt, even more preferably at least 12% wt, preferably at least 13% wt, more preferably at least 14% wt, even more preferably at least 15% wt, preferably at least 16% wt, more preferably at least 17% wt, even more preferably at least 18% wt of lead. The applicants have found that more lead in the first solder refining slag and/or the fourth solder refining slag brings more lead in the first and/or the second crude solder metal composition. More lead in this first and/or second crude solder metal product brings process benefits downstream, when the first and/or the second crude solder metal product is subjected to refining steps, such as needed when the first and/or the second crude solder metal product is the raw material for deriving higher purity tin and/or lead prime products, e.g. by vacuum distillation. The applicants have also found that a higher lead presence may bring processing benefits, such as more ready phase separations, in various steps that may be operated as part of the conversion of the first and/or the second crude solder metal product into higher purity tin and/or lead prime products.

Preferably the first solder refining slag and/or the fourth solder refining slag in the process according to the present invention comprises at most 28% wt of lead, more preferably at most 26% wt, even more preferably at most 24% wt, preferably at most 23% wt, more preferably at most 22% wt, even more preferably at most 21% wt, preferably at most 20% wt, more preferably at most 19% wt, even more preferably at most 18% wt, preferably at most 17% wt, more preferably at most 16% wt and even more preferably at most 15% wt of lead. The applicants have found that it is advantageous to limit the presence of lead in the first solder refining slag and/or the fourth solder refining slag in the process according to the present invention below the prescribed limits, because this allows room for the presence of tin. Having more tin brings the advantage that more tin may find its way into the first and/or the second crude solder metal composition and therefore more high purity tin final product may be obtained therefrom. Because high purity tin is of high commercial value, this technical advantage represents also a high economic benefit.

In an embodiment of the process according to the present invention, the first solder refining slag and/or the fourth solder refining slag comprises at least 12% wt together of tin and lead and optionally at most 50% wt together of tin and lead. Preferably the first solder refining slag and/or the fourth solder refining slag comprises at least 13% wt together of tin and lead, more preferably at least 14% wt, even more preferably at least 15% wt, preferably at least 16% wt, more preferably at least 17% wt, even more preferably at least 18% wt, preferably at least 19% wt, more preferably at least 20% wt, even more preferably at least 21% wt, preferably at least 22% wt, more preferably at least 23% wt, even more preferably at least 24% wt, preferably at least 25% wt, more preferably at least 26% wt, even more preferably at least 27% wt, preferably at least 28% wt, more preferably at least 29% wt, even more preferably at least 30% wt together of tin and lead. The applicants have found that the more tin and lead being present in the first solder refining slag and/or the fourth solder refining slag, the more tin and lead may end up in the first and/or the second crude solder metal composition. Because high purity tin and lead are commercial products that enjoy significant economic premiums, a higher amount of tin and lead together in the first and/or the second crude solder metal composition allows for a higher volume of high purity tin and of high purity lead that may be recovered therefrom. This also brings the advantage that the process according to the present invention may produce more crude solder for the same amount of copper production. The crude solder product may lead to the production of higher purity tin and/or higher purity lead products, i.e. products that may enjoy a significant economic upgrade, especially if the tin and/or lead have been derived from mixed metal feedstocks, which are often of a relatively lower economic value.

Preferably the first solder refining slag and/or the fourth solder refining slag in the process according to the present invention comprises at most 45% wt together of tin and lead, more preferably at most 40% wt, even more preferably at most 39% wt, preferably at most 38% wt, more preferably at most 36% wt, even more preferably at most 34% wt, preferably at most 33% wt, more preferably at most 32% wt, even more preferably at most 31% wt, preferably at most 30% wt, more preferably at most 29% wt, even more preferably at most 28% wt, preferably at most 27% wt, more preferably at most 26% wt, even more preferably at most 24% wt together of tin and lead. The applicants have found that it is advantageous to limit the presence of tin and lead together in the first solder refining slag and/or the fourth solder refining slag in the process according to the present invention below the prescribed limits, because this allows room for the presence of oxygen and of other metals that have under the process conditions a higher affinity for oxygen than copper, nickel, tin and lead. This is particularly valid for metals such as iron, aluminium, sodium, potassium, calcium and other alkali and earth-alkali metals, but also for other elements such as silicon or phosphorus. These elements having a higher affinity for oxygen typically end up as part of the second and/or third spent slag obtained from step f) and/or step o) meaning they are removed from the process with a discard stream. As a result, these elements do not end up as contaminants in one of the prime metal products from the process, meaning these streams enjoy a higher purity in the desired metals. The higher tolerance for these elements having a higher affinity for oxygen than copper, nickel, tin and lead, also widens the acceptance criteria for the feedstocks to the process according to the present invention. These upstream steps are therefore allowed to accept much more low quality raw materials, which are more abundantly available at economically more attractive conditions.

In an embodiment of the process according to the present invention, the first solder refining slag and/or the fourth solder refining slag comprises at most 4.0% wt and optionally at least 0.2% wt of nickel, preferably at most 3.5% wt, more preferably at most 3.0% wt, even more preferably at most 2.5% wt, preferably at most 2.0% wt, more preferably at most 1.5% wt, even more preferably at most 1.0% wt of nickel. The applicants have found that nickel behaves very similarly to copper in step e) and/or step n). The advantages of keeping the nickel content of the first solder refining slag and/or the fourth solder refining slag within the prescribed limits are therefore similar to those described for copper, or for copper and nickel together, elsewhere in this document. Preferably the first solder refining slag and/or the fourth solder refining slag comprises at least 0.20% wt of nickel, more preferably at least 0.25% wt, even more preferably at least 0.30% wt, preferably at least 0.35% wt, more preferably at least 0.40% wt, even more preferably at least 0.45% wt of nickel. This brings the advantage that the upstream process steps from which the first solder refining slag and/or the fourth solder refining slag is obtained, is able to accept feedstocks that contain nickel. These feedstocks are because of their nickel content, less acceptable in other processes, and may therefore be available more abundantly and at economically more attractive conditions.

In an embodiment of the process according to the present invention, the first solder refining slag and/or the fourth solder refining slag comprises at most 10.0% wt together of copper and nickel, preferably at most 9.0% wt, more preferably at most 8.0% wt, even more preferably at most 7.0% wt, yet more preferably at most 6.0% wt, preferably at most 5.5% wt, more preferably at most 5.0% wt, even more preferably at most 4.5% wt, preferably at most 4.0% wt, more preferably at most 3.5% wt, even more preferably at most 3.0% wt together of copper and nickel. The applicants have found that lower amounts of copper and/or nickel in the first solder refining slag and/or the fourth solder refining slag leave more room for more readily oxidising metals, such as iron, which have the tendency to reduce the viscosity of the slag phase, which is beneficial for a good quality and fast separation of the metal phase and the slag phase in the furnace, particularly as part of step e) and/or step n).

In an embodiment of the process according to the present invention, the first solder refining slag and/or the fourth solder refining slag comprises at least 10% wt and optionally at most 30% wt of iron. Preferably the first solder refining slag and/or the fourth solder refining slag comprises at least 11% wt of iron, more preferably at least 12% wt, even more preferably at least 13% wt, preferably at least 14% wt, more preferably at least 15% wt, even more preferably at least 16% wt, preferably at least 17% wt, more preferably at least 18% wt, even more preferably at least 19% wt, preferably at least 20% wt, more preferably at least 21% wt, even more preferably at least 22% wt of iron. Preferably the first solder refining slag and/or the fourth solder refining slag comprises at most 29% wt of iron, more preferably at most 28% wt, even more preferably at most 27% wt, preferably at most 26% wt, more preferably at most 25% wt, even more preferably at most 24% wt, preferably at most 23% wt, more preferably at most 22% wt, even more preferably at most 21% wt, preferably at most 20% wt of iron. The applicants have found that iron is an advantageous reducing agent for metals having under the process conditions a lower affinity for oxygen than iron, such as copper, nickel, tin and lead. The applicants therefore prefer to have an iron presence in the first solder refining slag and/or the fourth solder refining slag in compliance with the specified limits because this allows an upstream process step to use significant amounts of iron as a reducing agent, which e.g. brings the advantage of making many of the upstream process steps more energy efficient. Another advantage is that also the allowance criteria for feedstocks of these upstream process steps are relaxed, which thus allows to accept feedstocks that may be more abundantly available and at economically more attractive conditions.

In an embodiment of the process according to the present invention, the first solder refining slag and/or the fourth solder refining slag comprises at least 0.003% wt of antimony, preferably at least 0.004% wt, more preferably at least 0.005% wt, even more preferably at least 0.010% wt, preferably at least 0.015% wt, more preferably at least 0.020% wt, even more preferably at least 0.025% wt, preferably at least 0.030% wt, and optionally at most 0.200% wt, preferably at most 0.180% wt, more preferably at most 0.150% wt, even more preferably at most 0.100% wt of antimony, preferably at most 0.090% wt, more preferably at most 0.080% wt, even more preferably at most 0.070% wt, preferably at most 0.060% wt, more preferably at most 0.050% wt, even more preferably at most 0.040% wt, yet more preferably at most 0.030% wt of antimony. The applicants have found that also most of the antimony as part of the first solder refining slag and/or the fourth solder refining slag is typically reduced as part of step e) and/or step n) and most of it ends up as part of the first and/or the second crude solder metal composition. The applicants have further found that an amount of antimony may be acceptable in the process steps performed on the first and/or the second crude solder metal composition, even when these have the objective of recovering high purity tin and/or lead prime products. The applicants have found that an amount of antimony may be acceptable, and may even be desirable, in some of these higher purity metal prime products. The applicants have however found that the capability to accommodate antimony in these downstream processes is limited with respect to the amount of lead that is present. The applicants therefore also prefer to comply with the upper limits specified for antimony as part of the first solder refining slag and/or the fourth solder refining slag.

In an embodiment of the process according to the present invention including step n), step n) further comprises adding a fifth reducing agent to step n), preferably before reducing the fourth solder refining slag.

The applicants have found that the fifth reducing agent allows to drive the result of reduction step n) towards the desired separation of valuable metals into the second crude solder metal composition and maintaining rejectable metals into the fifth solder refining slag. The applicants have found that the sixth reducing agent may be a gas such as methane or natural gas, but may also be a solid or a liquid, such as carbon, a hydrocarbon, even aluminium or iron.

In an embodiment of the process according to the present invention the fifth reducing agent comprises, and preferably is, a metal having under the process conditions a higher affinity for oxygen than tin, lead, copper and nickel, preferably the fifth reducing agent comprises iron metal, more preferably scrap iron. The applicants prefer to use iron, preferably scrap iron as the reducing agent, because of its high availability at economically very attractive conditions. The applicants have found that the addition of the solid reducing agent may bring the additional benefit that the furnace requires less additional heating in order to maintain or reach its desired temperature. The applicants have found that this benefit may possibly be sufficiently large that additional heating by burning a fuel using air and/or oxygen may be limited or hardly be required in order to reach the desired temperature. The applicants have further found that the step n) may further benefit from the addition of silica, as explained hereinabove.

Preferably the fifth reducing agent contains little copper and/or nickel, more preferably less than 1% wt of copper and nickel together. This brings the advantage that little or no extra copper and/or nickel show up in the second crude solder metal composition, such that any consumption of process chemicals in a downstream step for refining this crude solder composition is not significantly increased.

In an embodiment of the process according to the present invention a second Pb and/or Sn containing fresh feed is added to step n), preferably before reducing the fourth solder refining slag, preferably the second Pb and/or Sn containing fresh feed comprising and preferably primarily being dross obtained from downstream processing of concentrated streams of Pb and/or Sn.

The applicants have found that step n) is also a very suitable location in the process for introducing materials that are rich in tin and/or lead, poor in copper and nickel, but which may contain metals which under the process conditions have a higher affinity for oxygen than tin and lead. Their addition to step n) brings the advantage that the tin and/or lead are readily recovered as part of the second crude solder metal composition, and are withdrawn from the process, while the so-called "less noble" metals have a short and straight process pathway into the third spent slag produced in the downstream step o).

The applicants have found that step n) is very suitable for recovering tin and/or lead, and optionally antimony and/or arsenic, in raw materials or process by-products that are rich in such metals yet relatively low in copper and/or nickel. The applicants have found that the second Pb and/or Sn containing fresh feed may further contain metals having under the process conditions a higher affinity for oxygen than tin and/or lead, such as sodium, potassium, calcium. Such metals may e.g. be introduced as part of process chemicals used in downstream steps for refining a tin and/or lead rich stream such as the first crude solder metal composition or a downstream derivative. The applicants have found that step n) is very suitable for recovering valuable metals from a dross by-product formed in one of the refining steps performed as part of the processes disclosed in WO 2018/060202 A1 or similar. Such dross by-product streams typically entrain economically significant amounts of tin and/or lead, but also contain the other metals that may have been introduced as part of process chemicals.

In an embodiment, the process according to the present invention further comprises the step of p) partially oxidizing the third lead-tin based metal composition, thereby forming a fourth lead-tin based metal composition and a sixth solder refining slag, followed by separating the sixth solder refining slag from the fourth lead-tin based metal composition.

The applicants have found that step p) brings the advantage that the third lead-tin based metal composition recovered from step o) is split into on the one hand a metal stream in which the copper from step p) concentrates, together with most of the nickel present, and on the other hand a slag phase in which very little copper but a significant portion of the tin and/or lead present in step p) concentrate, together with most of the iron, and also zinc if present. The applicants have found that this split brings the advantage that the two streams resulting from step p) may be processed differently and/or separately, using steps that are more appropriately suitable for their compositions.

In an embodiment, the process according to the present invention further comprises the step of q) recycling at least a part of the sixth solder refining slag to step d), preferably before oxidizing the first liquid bath, and/or adding at least a part of the sixth solder refining slag to the first liquid bath, and/or recycling at least a part of the sixth solder refining slag to step e), preferably before reducing the first solder refining slag.

The applicants prefer to recycle the sixth solder refining slag to step d) and/or to step e) because this allows a recovery of the tin and/or lead in this slag stream into the first crude solder metal composition from step e) or the second crude solder metal composition from step n), while the iron present in the sixth solder refining slag quite readily finds its way into the second spent slag from step f) without creating the risk that the iron would build up in a cycle as part of the process according to the present invention.

In an embodiment, the process according to the present invention further comprises the step of r) recycling at least a part of the fourth lead-tin based metal composition to step l) and/or adding at least a part of the fourth lead-tin based metal composition to the second liquid bath, preferably before oxidizing the second liquid bath as part of step l).

The applicants prefer to recycle the fourth lead-tin based metal composition to step l) because this metal stream is highly suitable for being contacted, together with the first dilute copper metal composition from step d), with the third copper refining slag from step j) that is added to the second liquid bath, whereby the third copper refining slag is partially reduced and the two added metal compositions are partially oxidized and an equilibrium may establish in which most of the copper present in the furnace, together with the nickel and some of the tin and/or lead, end up as part of the first high-copper metal composition, while any rejectable metals (iron, silicon, aluminium), together with a significant portion of the tin and/or lead present, end up as part of the third solder refining slag produced by step l).

In an embodiment, the process according to the present invention further comprises the step of s) recycling at least a part of the second dilute copper metal composition formed in step m) to step c), preferably before reducing the first copper refining slag, and/or recycling at least a part of the second dilute copper metal composition to step d), preferably before the first lead-tin metal composition is oxidized, and/or recycling at least a part of the second dilute copper metal composition to the first liquid bath.

The applicants have found, regardless which recycle option is selected for recycling the second dilute copper metal composition, that the copper recovered in the second dilute copper metal composition, in addition to any nickel that may be present, readily is recovered in the first dilute copper metal composition that is formed in step d), and further downstream readily finds its way into the first high-copper metal composition that is formed in step l), with which the copper may be withdrawn from the process, while at the same time any tin and/or lead in the second dilute copper metal composition may readily find its way into the first solder refining slag formed in step d) and may then further downstream be recovered as part of the first crude solder metal composition formed in step e), with which they may be withdrawn from the process.

In an embodiment of the process according to the present invention, step m) further comprises adding a fourth reducing agent to step m), preferably before reducing the third solder refining slag.

The applicants have found that the fourth reducing agent allows to drive the result of reduction step m) towards the desired separation of valuable metals into the second dilute copper metal composition and maintaining rejectable metals into the fourth solder refining slag. The applicants have found that the fourth reducing agent may be a gas such as methane or natural gas, but may also be a solid or a liquid, such as carbon, a hydrocarbon, even aluminium or iron.

In an embodiment of the process according to the present invention the fourth reducing agent comprises, and preferably is, a metal having under the process conditions a higher affinity for oxygen than tin, lead, copper and nickel, preferably iron metal, more preferably iron scrap.

The applicants prefer to use iron, preferably scrap iron as the reducing agent, because of its high availability at economically very attractive conditions. The applicants have found that the addition of the solid reducing agent may bring the additional benefit that the furnace requires less additional heating in order to maintain or reach its desired temperature. The applicants have found that this benefit may be sufficiently large such that additional heating by burning a fuel using air and/or oxygen may be limited or even hardly required in order to reach the desired temperature. The applicants have further found that the step m) may further benefit from the addition of silica, as explained hereinabove.

The applicants prefer to add to step m) an amount of fourth reducing agent that is rich in copper and iron, preferably as multimetal material, because this multimetal material is more readily available at more advantageous conditions than higher purity tin, higher purity copper or higher purity iron. Another suitable material may be electric motors, preferably such motors after use, because of their high contents of iron for the cores and copper for the windings. The applicants have found that the copper may readily be kept in the metal phase and be kept from moving into the slag phase, while any tin, lead and iron into this copper-containing fresh feed readily moves into the slag phase as their respective oxides, while it helps the chemical reduction of other metals that have under the process conditions a lower affinity for oxygen than tin, lead and iron.

In an embodiment of the process according to the present invention at least to one of the process steps involving a separation of a metal phase from a slag phase is added an amount of silica, preferably in the form of sand.

The applicants have found that the silica promotes the formation of the slag phase, improves the slag fluidity and improves the separation by gravity of the metal phase from the slag phase. Without wanting to be bound by this theory, the applicants believe that the reduction of the slag viscosity by itself significantly improves the phase separation because the metal bubbles formed in the slag phase because of a chemical reduction more readily move through the slag phase and may thus arrive at the interphase between the two phases, where they are able to be combined with the underlying continuous metal phase. The addition of silica further beneficially affects the equilibrium of particular metals between the metal phase and the slag phase, in particular for lead. The silica also increases the acidity of the slag, which further affects the equilibria in the furnace between the different phases. When the slag contains iron and is withdrawn from the furnace and granulated by contacting the hot liquid slag with water, the addition of silica may avoid the risk that the iron is present in a form which acts as a catalyst for the splitting of water and hence the formation of hydrogen gas, which represents an explosion hazard. Silica also increases the activity of any tin in the slag, forcing some $SnO_2$ to reduce to Sn metal, which Sn will move to the metal phase. This last mechanism reduces the amount of Sn that remains in the slag for the same underlying metal composition.

In an embodiment of the process according to the present invention the black copper is produced by a smelter step.

The applicants have found that a smelter step is highly suitable, and even preferable, for producing any one and preferably all of the black copper compositions that are used as possible feed and fresh feeds to steps of the process according to the present invention, in particular steps b), h), f) and/or o). A smelter step offers the advantage of being simple in operation and in equipment, hence economically advantageous. A smelter step brings the further advantage of being tolerant in terms of raw material quality. A smelter step is able to accept raw materials that are highly diluted and/or contaminated with a wide variety of components, as described above in this document. Because these mixed and/or contaminated raw materials have hardly any other end-use, they may be supplied at economically very attractive conditions. The capability of processing these raw materials and upgrading the valuable metals contained therein, is therefore of interest to the operator of the process according to the present invention.

In a smelting furnace the metals are molten, and organics and other combustible materials are burned off. Metals having a relatively high affinity for oxygen convert to their oxides and collect in the lower density supernatant slag phase. The metals having a lower affinity for oxygen remain as elemental metal and remain in the higher density liquid metal phase in the bottom of the smelter furnace. In a copper production step, the smelting step may be operated such that most iron ends up in the slag, while copper, tin and lead end up in the metal product, a stream which is typically called "black copper". Also most of the nickel, antimony, arsenic and bismuth end up as part of the black copper product.

The applicants have found that the metal product from a smelter step may be introduced into the process according to the present invention as a molten liquid, but may alternatively be allowed to solidify and cool down, such as by granulation, which allows for possible transport between different industrial sites, and subsequently be introduced into the process before or after being melted again.

In an embodiment of the process according to the present invention at least one of the first crude solder metal composition and the second crude solder metal composition is pre-refined using silicon metal to produce a pre-refined solder metal composition. A suitable pre-refinement treatment for such crude solder metal composition is described in DE 102012005401 A1.

In an embodiment, the process according to the present invention further comprises the step of cooling the first crude solder metal composition and/or the second crude solder metal composition and/or the pre-refined solder metal composition down to a temperature of at most 825° C. to produce a bath containing a first supernatant dross which by gravity becomes floating upon a first liquid molten tuned solder phase. The applicants have found that this further downstream process step is able to remove a significant amount of copper and other undesirable metals from the crude solder. Further details for this step may be found in WO 2018/060202 A1. The applicants have further found that this cooling step, in combination with some of the further downstream process steps performed on this lead/tin stream, may offer an alternative, at least partially, to the pre-retreatment with silicon metal mentioned elsewhere in this document. This is advantageous because silicon metal is a rather scarce process chemical and it is of benefit if its use may be reduced and/or eliminated.

In an embodiment, the process according to the present invention further comprises the step of adding an alkali metal and/or an earth alkali metal, or a chemical compound comprising an alkali metal and/or an earth alkali metal, to the first crude solder metal composition and/or to the second crude solder metal composition and/or to the pre-refined solder metal composition and/or to the first liquid molten tuned solder phase to form a bath containing a second supernatant dross which by gravity comes floating on top of a second liquid molten tuned solder phase.

In an embodiment, the process according to the present invention further comprises the step of removing the second supernatant dross from the second liquid molten tuned solder phase, thereby forming a second tuned solder.

In an embodiment, the process according to the present invention further comprises the step of removing the first supernatant dross from the first liquid molten tuned solder phase, thereby forming a first tuned solder.

In an embodiment, the process according to the present invention further comprises the step of distilling the first tuned solder and/or the second tuned solder, wherein lead (Pb) is removed from the solder by evaporation and a distillation overhead product and a distillation bottom product are obtained, preferably by a vacuum distillation.

In an embodiment of the process according to the present invention including the step of distilling at least one of the solder streams to remove lead (Pb) from the solder by evaporation and a distillation overhead product and a distillation bottom product are obtained, the distillation bottom product comprises at least 0.6% wt of lead. The benefits thereof are explained in WO 2018/060202 A1.

In an embodiment of the process according to the present invention, at least a part of the process is electronically monitored and/or controlled, preferably by a computer program. The applicants have found that the control of steps from the process according to the present invention electronically, preferably by a computer program, brings the advantage of a much better processing, with results that are much more predictable and which are closer to the process targets. For instance on the basis of temperature measurements, if desired also pressure and/or level measurements and/or in combination with the results of chemical analyses of samples taken from process streams and/or analytical results obtained on-line, the control program may control the equipment relating to the supply or removal of electrical energy, supply of heat or of a cooling medium, a flow and/or a pressure control. The applicants have found that such monitoring or control is particularly advantageous with steps that are operated in continuous mode, but that it may also be advantageous with steps that are operated in batch or semi-batch. In addition and preferably, the monitoring results obtained during or after the performance of steps in the process according to the present invention are also of use for the monitoring and/or control of other steps as part of the process according to the present invention, and/or of processes that are applied upstream or downstream of the process according to the present invention, as part of an overall process within which the process according to the present invention is only a part. Preferably the entire overall process is electronically monitored, more preferably by at least one computer program. Preferably the overall process is electronically controlled as much as possible.

The applicants prefer that the computer control also provides that data and instructions are passed on from one computer or computer program to at least one other computer or computer program or module of the same computer program, for the monitoring and/or control of other processes, including but not limited to the processes described in this document.

The applicants prefer to operate particular steps of the process according to the present invention in a top blown rotary converter (TBRC), optionally a furnace as disclosed in U.S. Pat. No. 3,682,623, FIGS. 3-5 and their associated description, or a furnace commonly known as a Kaldo furnace or Kaldo converter. The applicants particularly prefer to use this type of furnace in the steps in which a chemical reaction is taking place and/or in which an equilibrium is desired between a molten slag phase and an underlying molten metal phase.

The applicants have found that this type of furnaces allows to process complex materials, materials which generate a high amount of slag phase, and material with large variations in terms of physical appearance as well as in chemical composition. This type of furnace is able to accept as feeds slags from other process steps and/or large pieces of solid materials, i.e. feedstocks that are much more difficult to introduce into other types of furnace designs.

Such furnaces bring the advantage that the furnace may be rotated, such that a more intensive contact between solids and liquids, and between different liquid phases may be obtained, which allows to approach and/or reach the desired equilibrium between the phases faster.

Preferably the rotation speed of the furnace is variable, such that the rotation speed of the furnace may be adapted to the process step which is performed in the furnace. Process steps requiring reaction and moving the furnace content towards equilibrium prefer a high rotation speed, while other process steps, such as when solid fresh feed needs to be melted, may prefer a low rotation speed or possibly even no rotation at all.

Preferably the inclination angle of the furnace is variable, which allows for a better control of the mixing, and therewith also of the reaction kinetics. A variable inclination angle also allows for a better start-up on solid feeds, preferably at a low inclination angle, until sufficient and sufficiently hot liquid, and hence more fluid liquid, has been formed to keep the remaining solids afloat.

The applicants prefer under particular conditions to operate the furnace at least periodically not in the conventional rotating mode but in a so-called "rocking mode", i.e. alternately rotating the furnace in opposite directions only a part of a full 360° rotation. The applicants have found that this mode of operation may avoid possibly extreme forces on the furnace driving equipment when the furnace would be fully rotating with the same content. The applicants prefer to apply this mode of operation when there is still a relatively high amount of solids in the furnace charge and too low a liquid presence for keeping these solids afloat, or when the liquid in the furnace is still poorly fluid, e.g. because it is still rather cold.

The applicants prefer the TBRC to have a refractory lining, and more preferably that lining having two layers. Preferably the inner layer of the lining, i.e. the layer in contact with the furnace content, is made of a material that visually brightens up at the high temperatures of the furnace content during full operation, while the underlying layer material remains dark when it is exposed to the vessel internal temperatures. This setup allows a rapid spotting of defects in the lining by simple visual inspection during furnace operation.

The outer layer of the lining thus acts as a kind of safety layer. The applicants prefer that this safety lining has a lower thermal conductivity than the inner lining layer.

When installing the lining of the TBRC, the lining preferably being constructed by arranging individual and conically shaped refractory bricks, the applicants prefer to provide a sacrificial layer in between individual lining elements or bricks, such as a layer of cardboard or roofing. This brings the advantage, as the furnace temperature heats up during its first campaign, that the sacrificial layer incinerates and disappears, and makes room for the thermal expansion of the bricks.

Several steps in the process according to the present invention prefer that the underlying molten metal phase is tapped from the furnace while the supernatant liquid slag phase is still in the furnace. The applicants prefer to tap this liquid metal by means of a drain or tap hole in the furnace refractory lining. The applicants prefer to plug this hole by means of a sacrificial metal rod during the furnace movements of the operation. In order to prepare the metal tapping, the applicants prefer to burn out this rod while it is kept above the furnace liquid level, and to temporarily plug the burned out tap hole with a combustible plug, e.g. made of cardboard, after which the furnace is turned into the metal tapping position. The applicants have found that the time of incinerating the combustible plug provides the time to turn the furnace into the metal tapping position and the tap hole to pass the slag phase.

For heating the furnace with external heat supply, the applicants prefer to use a burner which is burning a mixture of fuel and oxygen source, rather than introducing the fuel and the oxygen source separately into the furnace. The applicants have found that such a mixing burner may be more difficult to operate, but that it brings the advantage that the flame may be more accurately be directed to the preferred spot inside the furnace.

The applicants have found that the ratio of fuel relative to the oxygen source may readily be used to control the oxidative/reductive furnace regime inside the furnace, and hence assist in adjusting and/or controlling the direction of the chemical reactions that are supposed to take place inside the furnace.

The applicants have found that those steps as part of the process according to the present invention in which cold feedstocks are introduced may generate dioxins and/or volatile organic compounds (VOC). The applicants prefer to perform these process steps in furnaces that are equipped with proper equipment to capture dioxins and/or VOC's from the exhaust vapours. The applicants have found that the process may be operated in a way that only a part of the furnaces need such exhaust treatment equipment, while for the other furnaces dust collection and/or filtering is sufficient for meeting the legally imposed emission standards.

The process according to the present invention includes several occasions for transferring a liquid molten metal and/or slag phase from one furnace to another. The applicants have found that this transfer is most conveniently performed using transfer ladles. In order to protect the construction materials of the transfer ladles, the applicants prefer to provide the ladles with an internal layer of solid slag coating.

EXAMPLE

The following example shows a preferred embodiment of the present invention. The example is further illustrated by the FIG. 1, which is showing a flow diagram of the core part of the process according to the present invention. In this process part are recovered, from a variety of various feedstocks and starting from a black copper composition 1, a refined anode grade copper product 9, a high copper metal composition by-product 22, two crude solder metal composition products 18 and 26, and three spent slags 12, 20 and 28.

In the FIG. 1, the numbers represent the following claim features:
1. Black copper composition feedstock to step b) (100)
2. Fresh feed to step b) (100)
3. First copper refining slag
4. First enriched copper metal phase
5. Fresh feed to step h) (200)
6. Second copper refining slag
7. Second enriched copper metal phase
8. Third copper refining slag
9. Third enriched copper metal phase—Anode Grade
10. Second lead-tin based metal composition
11. Second dilute copper metal composition
12. First spent slag
13. First lead-tin based metal composition
14. Sixth solder refining slag to the first liquid bath (450) before step d) (500)
15. First dilute copper metal composition
16. First solder refining slag
17. First Pb and/or Sn containing fresh feed to step e) (600)
18. First crude solder metal composition
19. Second solder refining slag
20. Second spent slag
21. Fourth lead-tin based metal composition
22. First high-copper metal composition—portion removed from the process
23. Third solder refining slag
24. Fourth solder refining slag
25. Second Pb and/or Sn containing fresh feed to step n) (1000)
26. Second crude solder metal composition
27. Fifth solder refining slag 28. Third spent slag
29. Third lead-tin based metal composition
30. First high-copper metal composition—portion recycled to step b) and/or step d)
31. Fresh feed to step j) (300)
50. First copper containing fresh feed to step f) (700)
51. Fresh feed to step p) (1200)
52. Fresh feed to the second liquid bath (550) before step l) (800)
53. Sixth solder refining slag recycled to step e) (600)
55. Second copper containing fresh feed to step o) (1100)
56. Fresh feed to step c) (400)
57. Fresh feed to the first liquid bath (450) before step d) (500)
58. Fresh feed to step m) (900)
450 First liquid bath
550 Second liquid bath
100 Process step b)
200 Process step h)
300 Process step j)
400 Process step c)
500 Process step d)
600 Process step e)
700 Process step f)
701 Process step g)
800 Process step l)
801 Recycle of stream 30 from step l) to process step b) and/or d)
900 Process step m)
901 Process step s), i.e. the recycle of stream 11 from step m) to process step c)
1000 Process step n)
1100 Process step o)
1200 Process step p)
1201 Process step q)—Recycle of part of the sixth solder refining slag (14) from step p) to the first liquid bath (450) and/or (53) to process step e) (600)
1202 Process step r)—Recycle of the fourth lead-tin based metal composition (21) from step p) to the second liquid bath (550).

Step b) (100): A top blown rotary converter (TBRC), herein used as a refining furnace for step b) (100), was charged with 21,345 kg of black copper 1 from an upstream melting furnace, 30,524 kg of a first high-copper metal composition 30 recycled from the downstream process step l) (800) as part of a previous process cycle, and 86,060 kg of fresh feed 2. The fresh feed 2 mainly consisted of bronze, red brass and some feedstocks rich in copper but low in other valuable metals. The compositions and amounts of all the feeds to the furnace charge of step b) (100) are shown in Table I. To the feeds thus charged was added an amount of silica flux in the form of sand flux sufficient to obtain the desired effects of phase separation and/or slag fluidity. The feed was melted and/or heated under oxidizing conditions and partially with blowing of oxygen while the furnace was rotated.

TABLE I

| Step b) (100) Mt/charge | Black Copper 1 21.345 | | First High-Cu metal 30 30.524 | | Fresh Feed 2 86.060 | |
|---|---|---|---|---|---|---|
| | Mton | % wt | Mton | % wt | Mton | % wt |
| Cu | 16.153 | 75.68% | 28.143 | 92.20% | 68.410 | 79.49% |
| Sn | 1.114 | 5.22% | 0.522 | 1.71% | 1.380 | 1.60% |
| Pb | 2.218 | 10.39% | 0.531 | 1.74% | 3.116 | 3.62% |
| Zn | 0.989 | 4.63% | 0.005 | 0.02% | 2.470 | 2.87% |
| Fe | 0.336 | 1.57% | 0.002 | 0.01% | 1.747 | 2.03% |
| Ni | 0.428 | 2.00% | 1.105 | 3.62% | 0.868 | 1.01% |
| Sb | 0.043 | 0.20% | 0.171 | 0.56% | 0.085 | 0.10% |
| Bi | 0.005 | 0.03% | 0.012 | 0.04% | 0.013 | 0.02% |
| As | 0.013 | 0.06% | 0.017 | 0.06% | 0.014 | 0.02% |

A significant amount of the zinc present in the feed was fumed out of the furnace. At the end of the first oxidation step b) (100), the first copper refining slag 3 was poured off and transferred to a slag retreatment furnace for being subjected to process step c) (400). This first copper refining slag 3 was rich in lead, tin, zinc and iron. The detailed composition of this slag 3 as well as the first enriched copper metal phase 4 and dust produced during step b) (100), together with their amounts, are shown in Table II. The first enriched copper metal phase 4 was transferred to another TBRC for being subjected to process step h) (200).

TABLE II

| Step b) (100) Mt/charge | First Cu Refining Slag-3 27.061 | | First enriched copper metal phase-4 116.371 | | Dust 1.47 | |
|---|---|---|---|---|---|---|
| | Mton | % wt | Mton | % wt | Mton | % wt |
| Cu | 3.231 | 11.94% | 111.367 | 95.70% | 0.221 | 15.00% |
| Sn | 1.810 | 6.69% | 1.059 | 0.91% | 0.147 | 10.00% |
| Pb | 3.875 | 14.32% | 1.760 | 1.51% | 0.221 | 15.00% |
| Zn | 3.023 | 11.17% | 0.000 | 0.00% | 0.441 | 30.00% |
| Fe | 2.076 | 7.67% | 0.005 | 0.00% | 0.000 | 0.00% |
| Ni | 1.012 | 3.74% | 1.396 | 1.20% | 0.000 | 0.00% |
| Sb | 0.052 | 0.19% | 0.249 | 0.21% | 0.000 | 0.00% |
| Bi | 0.001 | 0.00% | 0.031 | 0.03% | 0.000 | 0.00% |
| As | 0.006 | 0.02% | 0.038 | 0.03% | 0.000 | 0.00% |

Step h) (200): To the first enriched copper metal phase 4, 27,091 kg of copper rich fresh feed 5 was added, and also an amount of sand flux sufficient to obtain the desired effects of phase separation and/or slag fluidity. This fresh feed 5 consisted of some extra black copper from the upstream smelter in addition to copper rich solid material for cooling the furnace temperature. The composition and amounts of the feeds to the furnace charge of step h) (200) are set forth in Table Ill.

TABLE III

| Step h) (200) | First enriched copper metal phase - 4 116.371 | | Fresh Feed 5 27.091 | |
|---|---|---|---|---|
| Mt/charge | Mton | % wt | Mton | % wt |
| Cu | 111.367 | 95.70% | 23.794 | 92.48% |
| Sn | 1.059 | 0.91% | 0.277 | 1.08% |
| Pb | 1.760 | 1.51% | 0.579 | 2.25% |
| Zn | 0.000 | 0.00% | 0.513 | 1.99% |
| Fe | 0.005 | 0.00% | 0.209 | 0.81% |
| Ni | 1.396 | 1.20% | 0.131 | 0.51% |
| Sb | 0.249 | 0.21% | 0.015 | 0.06% |
| Bi | 0.031 | 0.03% | 0.004 | 0.01% |
| As | 0.038 | 0.03% | 0.002 | 0.01% |

Oxidation of the furnace content was performed by blowing oxygen into the furnace content. At the end of the second oxidation step, the second copper refining slag 6 was poured off and transferred to another slag retreatment furnace for being subjected to step d) (500). The remaining second enriched copper metal phase 7 was transferred to another TBRC for being subjected to step j) (300). The composition and amounts of the second copper refining slag 6 and the second enriched copper metal phase 7 are shown in Table IV. As may be seen in Table IV, the metal phase 7 had significantly been enriched in copper content, in comparison with the furnace feed streams 4 and 5 in Table III.

TABLE IV

| Step h) (200) | Second Cu Refining Slag 6 17.230 | | Second enriched copper metal phase - 7 128.573 | |
|---|---|---|---|---|
| Mt/charge | Mton | % wt | Mton | % wt |
| Cu | 7.161 | 41.56% | 126.573 | 98.45% |
| Sn | 1.237 | 7.18% | 0.083 | 0.06% |
| Pb | 2.004 | 11.63% | 0.316 | 0.25% |
| Zn | 0.515 | 2.99% | 0.000 | 0.00% |
| Fe | 0.214 | 1.24% | 0.000 | 0.00% |
| Ni | 0.639 | 3.71% | 0.874 | 0.68% |
| Sb | 0.109 | 0.63% | 0.154 | 0.12% |
| Bi | 0.009 | 0.05% | 0.026 | 0.02% |
| As | 0.007 | 0.04% | 0.033 | 0.03% |

Step j) (300): To the second enriched copper metal phase 7, another 22,096 kg of copper rich fresh feed 31 was added. The composition and amounts of the feeds to the furnace charge of step j) (300) are shown in Table V.

TABLE V

| Step j) (300) | Second enriched copper metal phase - 7 128.573 | | Fresh Feed 31 22.096 | |
|---|---|---|---|---|
| Mt/charge | Mton | % wt | Mton | % wt |
| Cu | 126.573 | 98.45% | 20.647 | 93.44% |
| Sn | 0.083 | 0.06% | 0.077 | 0.35% |
| Pb | 0.316 | 0.25% | 0.177 | 0.80% |
| Zn | 0.000 | 0.00% | 0.192 | 0.87% |
| Fe | 0.000 | 0.00% | 0.109 | 0.49% |
| Ni | 0.874 | 0.68% | 0.029 | 0.13% |
| Sb | 0.154 | 0.12% | 0.003 | 0.02% |
| Bi | 0.026 | 0.02% | 0.001 | 0.00% |
| As | 0.033 | 0.03% | 0.000 | 0.00% |

Oxygen blowing was performed on the furnace content, and at the end of the blowing period an amount of sand flux was added sufficient to obtain the desired effects of phase separation and/or slag fluidity, before pouring off the third copper refining slag 8. The remaining anode grade copper metal phase 9 was removed from the furnace for further processing, e.g. purification by electrorefining. The composition and amounts of the third copper refining slag 8 and of the anode grade copper 9 are given in Table VI. As can be seen in Table VI, the metal phase 9 had been further enriched in copper content, as compared with the furnace feed streams 7 and/or 31 in Table V.

TABLE VI

| Step j) (300) | Third Cu Refining Slag 8 17.024 | | Third enriched copper metal phase - 9 - Anode Grade 134.781 | |
|---|---|---|---|---|
| Mt/charge | Mton | % wt | Mton | % wt |
| Cu | 12.535 | 73.63% | 133.546 | 99.08% |
| Sn | 0.138 | 0.81% | 0.022 | 0.02% |
| Pb | 0.465 | 2.73% | 0.025 | 0.02% |
| Zn | 0.192 | 1.13% | 0.000 | 0.00% |
| Fe | 0.109 | 0.64% | 0.000 | 0.00% |
| Ni | 0.375 | 2.20% | 0.542 | 0.40% |
| Sb | 0.099 | 0.58% | 0.057 | 0.04% |
| Bi | 0.006 | 0.04% | 0.020 | 0.02% |
| As | 0.006 | 0.03% | 0.028 | 0.02% |

Step c) (400): 26,710 kg of the first copper refining slag 3 (with the composition given in Table VII), was introduced into another TBRC used as slag retreatment furnace, together with 6,099 kg of fresh feed 56 and 11,229 kg of a second dilute copper metal phase 11 obtained from a process step m) (900) from a previous process cycle and together with 23,000 kg of a second lead-tin based metal phase or composition 10 obtained from a process step f) (700) from a previous process cycle. To this furnace content, 10,127 kg of scrap iron as reducing agent was added. Further added was an amount of sand flux sufficient to obtain the desired effects of safety, phase separation and/or slag fluidity. Once filling was completed the furnace was rotated at a speed in the range of 18-20 rpm. The composition and amounts of the feeds to the furnace charge of step c) (400) are shown in Table VII.

TABLE VII

| Step c) (400) | First Cu Refining Slag-3 26.710 | | Fresh Feed 56 6.099 | | Second dilute Cu metal phase-11 11.229 | | Second Pb-Sn based metal phase-10 23.000 | |
|---|---|---|---|---|---|---|---|---|
| Mt/chge | Mton | % wt | Mton | % wt | Mton | % wt | Mton | % wt |
| Cu | 3.189 | 11.94% | 0.987 | 16.18% | 6.960 | 61.98% | 16.665 | 72.50% |
| Sn | 1.787 | 6.69% | 0.325 | 5.32% | 2.095 | 18.66% | 1.685 | 7.33% |
| Pb | 3.825 | 14.32% | 0.419 | 6.87% | 0.775 | 6.90% | 2.521 | 10.97% |
| Zn | 2.983 | 11.17% | 0.178 | 2.92% | 0.006 | 0.05% | 0.381 | 1.66% |
| Fe | 2.049 | 7.67% | 1.440 | 23.61% | 0.020 | 0.18% | 1.233 | 5.36% |
| Ni | 0.999 | 3.74% | 0.135 | 2.21% | 1.291 | 11.50% | 0.429 | 1.87% |
| Sb | 0.052 | 0.19% | 0.017 | 0.28% | 0.073 | 0.65% | 0.044 | 0.19% |
| Bi | 0.001 | 0.00% | 0.000 | 0.00% | 0.002 | 0.02% | 0.006 | 0.02% |
| As | 0.006 | 0.02% | 0.000 | 0.00% | 0.003 | 0.03% | 0.011 | 0.05% |

When the reduction of copper, tin and lead had sufficiently been progressed, a first lead-tin based metal composition 13, dust and a first spent slag 12 had been produced. The compositions and amounts of these products are given in Table VIII. The first spent slag 12 was poured off and removed from the process. The first lead-tin based metal composition 13 was transferred to another TBRC to become part of the first liquid bath 450.

TABLE VIII

| Step c) (400) | First spent slag 12 31.287 | | First Pb-Sn based metal phase-13 46.718 | | Dust 1.346 | |
|---|---|---|---|---|---|---|
| Mt/chge | Mton | % wt | Mton | % wt | Mton | % wt |
| Cu | 0.111 | 0.35% | 28.105 | 60.32% | 0.031 | 2.27% |
| Sn | 0.074 | 0.24% | 5.645 | 12.11% | 0.170 | 12.64% |
| Pb | 0.156 | 0.50% | 7.176 | 15.40% | 0.276 | 20.52% |
| Zn | 2.372 | 7.58% | 0.568 | 1.22% | 0.612 | 45.50% |
| Fe | 12.049 | 38.51% | 2.047 | 4.39% | 0.010 | 0.71% |
| Ni | 0.012 | 0.04% | 2.834 | 6.08% | 0.002 | 0.12% |
| Sb | 0.000 | 0.00% | 0.184 | 0.39% | 0.002 | 0.18% |
| Bi | 0.000 | 0.00% | 0.008 | 0.02% | 0.000 | 0.00% |
| As | 0.000 | 0.00% | 0.016 | 0.03% | 0.004 | 0.31% |

Step d) (500): For forming the first liquid bath 450, to the 46,718 kg of first lead-tin based metal composition 13 were added 17,164 kg of the second copper refining slag 6 (having the composition given in Table IV) together with 9,541 kg of fresh feed 57, and 474 kg of sixth solder refining slag 14 (recycled from the downstream process step p) (1200) as part of a previous process cycle). Further added was an amount of sand flux sufficient to obtain the desired effects of phase separation and/or slag fluidity. The compositions and amounts of the components of the first liquid bath 450, which formed the furnace charge for step d) (500), are shown in Table IX.

TABLE IX

| Step d) (500) | First Pb-Sn based metal phase-13 46.718 | | Fresh Feed 57 9.541 | | Sixth Solder Refining Slag-14 0.474 | | Second Cu Refining Slag-6 17.164 | |
|---|---|---|---|---|---|---|---|---|
| Mt/chge | Mton | % wt | Mton | % wt | Mton | % wt | Mton | % wt |
| Cu | 28.105 | 60.32% | 1.749 | 22.09% | 0.015 | 3.08% | 7.133 | 41.56% |
| Sn | 5.645 | 12.11% | 0.484 | 6.11% | 0.021 | 4.51% | 1.232 | 7.18% |
| Pb | 7.176 | 15.40% | 0.677 | 8.54% | 0.060 | 12.69% | 1.996 | 11.63% |
| Zn | 0.568 | 1.22% | 0.308 | 3.89% | 0.025 | 5.30% | 0.513 | 2.99% |
| Fe | 2.047 | 4.39% | 2.675 | 33.77% | 0.134 | 28.21% | 0.213 | 1.24% |
| Ni | 2.834 | 6.08% | 0.209 | 2.63% | 0.002 | 0.33% | 0.637 | 3.71% |
| Sb | 0.184 | 0.39% | 0.028 | 0.35% | 0.000 | 0.01% | 0.108 | 0.63% |
| Bi | 0.008 | 0.02% | 0.000 | 0.00% | 0.000 | 0.00% | 0.009 | 0.05% |
| As | 0.016 | 0.03% | 0.000 | 0.00% | 0.000 | 0.00% | 0.007 | 0.04% |

The mixture of slags and metal phase was reacted until in the slag phase the concentrations of copper and/or nickel were sufficiently reduced. The reaction was forcing more tin and lead into the slag phase. At that point the furnace was bottom-tapped thereby removing a first dilute copper metal composition 15 from the furnace. The first solder refining slag 16 together with approximately 1 metric ton left over from the first dilute copper metal phase 15 were passed to another TBRC for being subjected to the next step e) (600). The compositions and amounts of both product streams obtained from step 500, except for the 1 metric ton of metal phase that had remained with the slag phase, are set forth in Table X.

TABLE X

| Step d) (500) | First Solder Refining Slag - 16 28.200 | | First dilute Cu metal phase - 15 49.792 | |
|---|---|---|---|---|
| Mt/chge | Mton | % wt | Mton | % wt |
| Cu | 1.047 | 3.71% | 35.387 | 71.07% |
| Sn | 1.375 | 4.87% | 5.925 | 11.90% |
| Pb | 5.268 | 18.68% | 4.541 | 9.12% |
| Zn | 1.393 | 4.94% | 0.023 | 0.05% |
| Fe | 5.059 | 17.94% | 0.013 | 0.03% |
| Ni | 0.282 | 1.00% | 3.331 | 6.69% |
| Sb | 0.010 | 0.04% | 0.304 | 0.61% |
| Bi | 0.000 | 0.00% | 0.017 | 0.03% |
| As | 0.000 | 0.00% | 0.022 | 0.05% |

The first dilute Cu metal phase 15 from step d) contained about 0.08% wt of silver (Ag) and 0.03% wt of sulphur.

Step e) (600): 14,987 kg of first lead and tin containing fresh feed 17 was added to the first solder refining slag 16 before this mixture was being reduced in step e) (600). The reduction was done by adding 8,017 kg of scrap iron as reducing agent. Further added to the furnace as part of step e) (600) were 8,650 kg of the sixth solder refining slag 53, obtained from the downstream process step p) (1200) as part of a previous process cycle, in addition to an amount of sand flux sufficient to obtain the desired effects of phase separation and/or slag fluidity. The compositions and amounts of the feeds forming the furnace charge for step e) (600) are shown in Table XI.

TABLE XI

| Step e) (600) | First Solder Refining Slag-16 28.200 | | 1st Pb + Sn containing Fresh Feed-17 14.987 | | Sixth Solder Refining Slag-53 8.650 | | First dilute Cu metal phase-15 1.000 | |
|---|---|---|---|---|---|---|---|---|
| Mt/chge | Mton | % wt | Mton | % wt | Mton | % wt | Mton | % wt |
| Cu | 1.047 | 3.71% | 1.361 | 9.08% | 0.266 | 3.08% | 0.711 | 71.07% |
| Sn | 1.375 | 4.87% | 4.184 | 27.92% | 0.390 | 4.51% | 0.119 | 11.90% |
| Pb | 5.268 | 18.68% | 7.738 | 51.63% | 1.098 | 12.69% | 0.091 | 9.12% |
| Zn | 1.393 | 4.94% | 0.043 | 0.29% | 0.458 | 5.30% | 0.000 | 0.05% |
| Fe | 5.059 | 17.94% | 0.106 | 0.71% | 2.440 | 28.21% | 0.000 | 0.03% |
| Ni | 0.282 | 1.00% | 0.011 | 0.07% | 0.029 | 0.33% | 0.067 | 6.69% |
| Sb | 0.010 | 0.04% | 0.298 | 1.99% | 0.001 | 0.01% | 0.006 | 0.61% |
| Bi | 0.000 | 0.00% | 0.002 | 0.01% | 0.000 | 0.00% | 0.000 | 0.03% |
| As | 0.000 | 0.00% | 0.000 | 0.00% | 0.000 | 0.00% | 0.000 | 0.05% |

A substantial quantity of zinc was fumed out of the furnace content during this partial reduction step. The reduction was stopped when the Sn concentration in the slag phase had attained about target level. At that point the furnace was again bottom-tapped to remove the first crude solder metal composition 18 from the process. The first crude solder metal composition 18 was further processed into lead and tin prime products. The second solder refining slag 19 was passed to another TBRC for further treatment as part of step f) (700). The compositions and amounts of the first crude solder metal 18, the second solder refining slag 19 as well as the dust obtained from step e) (600) are shown in Table XII.

TABLE XII

| Step e) (600) | First Crude Solder Metal Composition-18 23.132 | | Second Solder Refining Slag-19 36.667 | | Dust 1.551 | |
|---|---|---|---|---|---|---|
| Mt/chge | Mton | % wt | Mton | % wt | Mton | % wt |
| Cu | 3.256 | 13.53% | 0.116 | 0.39% | 0.016 | 1.06% |
| Sn | 5.389 | 22.40% | 0.778 | 2.60% | 0.150 | 9.64% |
| Pb | 13.224 | 54.97% | 0.652 | 2.18% | 0.318 | 20.52% |
| Zn | 0.087 | 0.36% | 1.106 | 3.70% | 0.706 | 45.50% |
| Fe | 0.282 | 1.17% | 15.003 | 50.20% | 0.011 | 0.71% |
| Ni | 0.354 | 1.47% | 0.032 | 0.11% | 0.002 | 0.12% |
| Sb | 0.311 | 1.29% | 0.002 | 0.01% | 0.003 | 0.18% |
| Bi | 0.002 | 0.01% | 0.000 | 0.00% | 0.000 | 0.00% |
| As | 0.000 | 0.00% | 0.000 | 0.00% | 0.000 | 0.03% |

Step f) (700): A further reduction step was performed on the second solder refining slag 19 by adding 1,207 kg of scrap iron as reducing agent. Further added as part of step f) (700) were 22,234 kg of first copper containing fresh feed 50 and an amount of sand flux sufficient to obtain the desired effects of safety, phase separation and/or slag fluidity. This fresh feed 50 consisted of some extra black copper from the upstream smelter in addition to some slag materials collected leftover from other process steps. The compositions and amounts of the feeds to the furnace charge of step f) (700) are given in Table XIII.

TABLE XIII

| Step f) (700) | Second Solder Refining Slag - 19 36.667 | | Cu-containing Fresh Feed - 50 22.234 | |
|---|---|---|---|---|
| Mt/chge | Mton | % wt | Mton | % wt |
| Cu | 0.116 | 0.39% | 16.630 | 75.95% |
| Sn | 0.778 | 2.60% | 1.003 | 4.58% |
| Pb | 0.652 | 2.18% | 2.052 | 9.37% |
| Zn | 1.106 | 3.70% | 1.010 | 4.61% |
| Fe | 15.003 | 50.20% | 0.509 | 2.32% |
| Ni | 0.032 | 0.11% | 0.405 | 1.85% |
| Sb | 0.002 | 0.01% | 0.042 | 0.19% |
| Bi | 0.000 | 0.00% | 0.005 | 0.03% |
| As | 0.000 | 0.00% | 0.011 | 0.05% |

When Cu, Sn and Pb in the slag were reduced down to at most 0.50% each, a second lead-tin based metal phase 10 and a second spent slag 20 had been produced. The compositions and amounts thereof are given in Tabled XIV. The second spent slag 20 was poured off and was removed from the process. The second lead-tin based metal composition 10 was passed onwards for the step c) (400) of the next process cycle before reducing the first copper refining slag (3).

TABLE XIV

| Step f) (700) | Second Pb—Sn based metal phase - 10 23.000 | | Second spent slag 20 37.523 | |
|---|---|---|---|---|
| Mt/chge | Mton | % wt | Mton | % wt |
| Cu | 16.665 | 72.50% | 0.115 | 0.31% |
| Sn | 1.685 | 7.33% | 0.090 | 0.24% |
| Pb | 2.521 | 10.97% | 0.188 | 0.50% |
| Zn | 0.381 | 1.66% | 1.726 | 4.60% |
| Fe | 1.233 | 5.36% | 15.384 | 41.00% |
| Ni | 0.429 | 1.87% | 0.010 | 0.03% |
| Sb | 0.044 | 0.19% | 0.000 | 0.00% |
| Bi | 0.006 | 0.02% | 0.000 | 0.00% |
| As | 0.011 | 0.05% | 0.000 | 0.00% |

Step l) (800): 17,024 kg of the third copper refining slag 8 (having the composition shown in Table VI) was fed to a TBRC used as slag retreatment furnace together with 14,920 kg of copper rich fresh feed 52 and 49,792 kg of the first dilute copper metal phase 15 obtained from step d) (500). Further added was an amount of sand flux sufficient to obtain the desired effects of phase separation and/or slag fluidity. These materials were melted along with the fourth lead-tin based metal phase 21 (20,665 kg) obtained from the downstream process step p) (1200) as part of a previous process cycle. These feeds together composed the second liquid bath 550. Once the filling and melting was completed, the furnace was rotated at a speed of 20 rpm. The compositions and amounts of the feeds to the slag retreatment furnace charge for step l) (800) are shown in Table XV.

TABLE XV

| Step l) (800) | Fourth Pb-Sn based metal phase-21 20.665 | | Fresh Feed 52 14.920 | | First dilute Cu metal phase-15 49.792 | | Third Cu Refining Slag-8 17.024 | |
|---|---|---|---|---|---|---|---|---|
| Mt/chge | Mton | % wt | Mton | % wt | Mton | % wt | Mton | % wt |
| Cu | 16.483 | 79.76% | 3.985 | 30.10% | 35.387 | 71.07% | 12.535 | 73.63% |
| Sn | 1.882 | 9.11% | 0.610 | 4.61% | 5.925 | 11.90% | 0.138 | 0.81% |
| Pb | 1.643 | 7.95% | 3.104 | 23.45% | 4.541 | 9.12% | 0.465 | 2.73% |
| Zn | 0.019 | 0.09% | 0.792 | 5.98% | 0.023 | 0.05% | 0.192 | 1.13% |
| Fe | 0.012 | 0.06% | 1.363 | 10.29% | 0.013 | 0.03% | 0.109 | 0.64% |
| Ni | 0.533 | 2.58% | 0.316 | 2.39% | 3.331 | 6.69% | 0.375 | 2.20% |
| Sb | 0.063 | 0.31% | 0.043 | 0.33% | 0.304 | 0.61% | 0.099 | 0.58% |
| Bi | 0.006 | 0.03% | 0.000 | 0.00% | 0.017 | 0.03% | 0.006 | 0.04% |
| As | 0.011 | 0.05% | 0.000 | 0.00% | 0.022 | 0.05% | 0.006 | 0.03% |

The mixture was reacted, if needed in addition partially oxidized using oxygen blowing, until the concentrations of copper and nickel in the slag had about reached their target values. At that point the furnace was bottom-tapped for removing 64,500 kg of the first high-copper metal composition (streams 22 and 30 together) from the third solder refining slag 23. The third solder refining slag 23, together with approximately 6 metric tons of the first high copper metal phase that was kept with the slag, was passed onto another TBRC for further treatment as part of step m) (900). The compositions and amounts of the product streams at the end of step l) (800) are set forth in Table XVI, and this time include the 6 metric tons of metal phase that remained with the slag phase on its way to the next treatment step.

TABLE XVI

| Step l) (800) | First High Cu metal phase 22 + 30 70.500 | | Third Solder Refining Slag 23 39.276 | |
|---|---|---|---|---|
| Mt/chge | Mton | % wt | Mton | % wt |
| Cu | 59.469 | 92.20% | 3.182 | 8.10% |
| Sn | 1.103 | 1.71% | 7.317 | 18.63% |
| Pb | 1.122 | 1.74% | 8.515 | 21.68% |
| Zn | 0.011 | 0.02% | 1.013 | 2.58% |
| Fe | 0.004 | 0.01% | 1.496 | 3.81% |
| Ni | 2.335 | 3.62% | 1.980 | 5.04% |
| Sb | 0.362 | 0.56% | 0.114 | 0.29% |
| Bi | 0.026 | 0.04% | 0.000 | 0.00% |
| As | 0.036 | 0.06% | 0.000 | 0.00% |

Of the first high copper metal composition in the furnace, 30,524 kg were fed into the copper refining furnace as stream 30 for beginning a new step b) (100) of a next cycle. A further 33,976 kg were removed from the process as stream 22, for further processing.

Step m) (900): After removal of the (30,524 kg+33,976 kg=) 64,500 kg of the first high copper metal phase (22+30) from the furnace, the furnace content was passed onto another TBRC for further treatment as part of step m) (900). The mixture of the 39,276 kg of third solder refining slag 23 and the 6 tons of metal having the composition of the first high copper metal composition was partially reduced as part of step m) (900). Scrap iron was introduced as reducing agent. Further added to step m) were an amount of sand flux sufficient to obtain the desired effects of phase separation and/or slag fluidity, and a minor amount (37 kg) of fresh feed 58. The compositions and amounts of the feeds forming the furnace charge for step m) (900) are given in Table XVII.

TABLE XVII

| Step m) (900) | Third Solder Refining Slag-23 39.276 | | Fresh Feed 58 0.037 | | Metal phase having remained with the slag (23) 6.000 | |
|---|---|---|---|---|---|---|
| Mt/chge | Mton | % wt | Mton | % wt | Mton | % wt |
| Cu | 3.182 | 8.10% | 0.001 | 2.38% | 5.532 | 92.20% |
| Sn | 7.317 | 18.63% | 0.001 | 3.31% | 0.103 | 1.71% |

TABLE XVII-continued

| Step m) | Third Solder Refining Slag-23 | | Fresh Feed 58 | | Metal phase having remained with the slag (23) | |
|---|---|---|---|---|---|---|
| (900) | 39.276 | | 0.037 | | 6.000 | 0 |
| Mt/chge | Mton | % wt | Mton | % wt | Mton | % wt |
| Pb | 8.515 | 21.68% | 0.004 | 10.88% | 0.104 | 1.74% |
| Zn | 1.013 | 2.58% | 0.002 | 5.94% | 0.001 | 0.02% |
| Fe | 1.496 | 3.81% | 0.010 | 27.53% | 0.000 | 0.01% |
| Ni | 1.980 | 5.04% | 0.000 | 0.22% | 0.217 | 3.62% |
| Sb | 0.114 | 0.29% | 0.000 | 0.00% | 0.034 | 0.56% |
| Bi | 0.000 | 0.00% | 0.000 | 0.00% | 0.002 | 0.04% |
| As | 0.000 | 0.00% | 0.000 | 0.00% | 0.003 | 0.06% |

The reduction step m) (900) was stopped when the concentrations of copper and nickel in the slag phase had sufficiently been reduced. At that point, the furnace was bottom-tapped to remove an amount of 11,229 kg of second dilute copper metal composition 11 for further treatment in step c) (400) of a next process cycle. A fourth solder refining slag 24 together with about 1,400 kg of metal having the composition of the second dilute copper metal phase 11 was passed onto another TBRC for being subjected to step n) (1000). The compositions and total amounts of the second dilute copper metal phase or composition 11 and of the fourth solder refining slag 24 are shown in Table XVIII, whereby the 1,400 kg of metal phase which is remaining with the slag phase is included in the total amount reported for the second dilute copper metal phase 11.

TABLE XVIII

| Step m) (900) | Second dilute Cu metal phase - 11 12.629 | | Fourth Solder Refining Slag - 24 41.342 | |
|---|---|---|---|---|
| Mt/chge | Mton | % wt | Mton | % wt |
| Cu | 6.960 | 61.98% | 1.389 | 3.36% |
| Sn | 2.095 | 18.66% | 5.069 | 12.26% |
| Pb | 0.775 | 6.90% | 7.743 | 18.73% |
| Zn | 0.006 | 0.05% | 1.009 | 2.44% |
| Fe | 0.020 | 0.18% | 9.037 | 21.86% |
| Ni | 1.291 | 11.50% | 0.752 | 1.82% |
| Sb | 0.073 | 0.65% | 0.066 | 0.16% |
| Bi | 0.002 | 0.02% | 0.000 | 0.00% |
| As | 0.003 | 0.03% | 0.000 | 0.00% |

The second dilute Cu metal phase 11 from step m) contained about 0.11% wt of silver (Ag) and 0.01% wt of sulphur.

Step n) (1000): After the 11,229 kg of second dilute copper metal phase 11 was tapped from the furnace, the remaining furnace content was transferred to another TBRC for performing step n) (1000). 11,789 kg of second lead and tin containing fresh feed 25 was added as part of step n) (1000) and the furnace content was further reduced. The reduction was done by adding 9,692 kg of scrap iron as reducing agent, along with an amount of sand flux sufficient to obtain the desired effects of phase separation and/or slag fluidity. The compositions and amounts of the different furnace feeds for step n) (1000) are shown in Table XIX.

TABLE XIX

| Step n) (1000) | Fourth Solder Refining Slag-24 41.342 | | Fresh Feed 25 11.789 | | Second dilute Cu metal phase-11 1.400 | |
|---|---|---|---|---|---|---|
| Mt/chge | Mton | % wt | Mton | % wt | Mton | % wt |
| Cu | 1.389 | 3.36% | 0.728 | 6.18% | 0.868 | 61.98% |
| Sn | 5.069 | 12.26% | 1.864 | 15.81% | 0.261 | 18.66% |
| Pb | 7.743 | 18.73% | 8.790 | 74.56% | 0.097 | 6.90% |
| Zn | 1.009 | 2.44% | 0.019 | 0.16% | 0.001 | 0.05% |
| Fe | 9.037 | 21.86% | 0.070 | 0.59% | 0.003 | 0.18% |
| Ni | 0.752 | 1.82% | 0.003 | 0.02% | 0.161 | 11.50% |
| Sb | 0.066 | 0.16% | 0.074 | 0.63% | 0.009 | 0.65% |
| Bi | 0.000 | 0.00% | 0.037 | 0.32% | 0.000 | 0.02% |
| As | 0.000 | 0.00% | 0.000 | 0.00% | 0.000 | 0.03% |

The partial reduction step was stopped when the concentration of tin in the slag phase had attained about target level. At that point the furnace was again bottom-tapped to remove the second crude solder metal composition 26 from the furnace, leaving only the fifth solder refining slag 27 in the furnace. The second crude solder metal composition 26 was further processed into lead and tin prime products. The fifth solder refining slag 27 was passed onto another TBRC for performing step o) (1100). The compositions and amounts of the second crude solder metal 26 and of the fifth solder refining slag 27 are set forth in Table XX.

TABLE XX

| Step n) (1000) | Second Crude Solder 26 23.080 | | Fifth Solder Refining Slag 27 41.956 | |
|---|---|---|---|---|
| Mt/chge | Mton | % wt | Mton | % wt |
| Cu | 2.934 | 10.57% | 0.054 | 0.13% |
| Sn | 6.245 | 22.49% | 0.975 | 2.32% |
| Pb | 16.080 | 57.90% | 0.550 | 1.31% |
| Zn | 0.000 | 0.00% | 1.032 | 2.46% |
| Fe | 1.363 | 4.91% | 17.373 | 41.41% |
| Ni | 0.895 | 3.22% | 0.021 | 0.05% |
| Sb | 0.149 | 0.54% | 0.000 | 0.00% |
| Bi | 0.038 | 0.14% | 0.000 | 0.00% |
| As | 0.000 | 0.00% | 0.000 | 0.00% |

Step o) (1100): A further reduction step was performed on the fifth solder refining slag 27 by adding to it 922 kg of scrap iron as reducing agent along with 23,735 kg of copper rich fresh feed 55 and an amount of sand flux sufficient to obtain the desired effects of safety, phase separation and/or slag fluidity. The second copper containing fresh feed 55 consisted primarily of extra black copper from the upstream smelter. The compositions and amounts of the feeds to step o) (1100) are given in Table XXI.

TABLE XXI

| Step o) (1100) | Fifth Solder Refining Slag 27 41.956 | | Cu-containing Fresh Feed 55 23.735 | |
|---|---|---|---|---|
| Mt/chge | Mton | % wt | Mton | % wt |
| Cu | 0.054 | 0.13% | 15.456 | 67.27% |
| Sn | 0.975 | 2.32% | 0.997 | 4.34% |
| Pb | 0.550 | 1.31% | 2.022 | 8.80% |
| Zn | 1.032 | 2.46% | 1.097 | 4.77% |
| Fe | 17.373 | 41.41% | 1.603 | 6.98% |
| Ni | 0.021 | 0.05% | 0.391 | 1.70% |
| Sb | 0.000 | 0.00% | 0.040 | 0.17% |

TABLE XXI-continued

| Step o) (1100) | Fifth Solder Refining Slag 27 41.956 | | Cu-containing Fresh Feed 55 23.735 | |
|---|---|---|---|---|
| Mt/chge | Mton | % wt | Mton | % wt |
| Bi | 0.000 | 0.00% | 0.005 | 0.02% |
| As | 0.000 | 0.00% | 0.011 | 0.05% |

The reduction was continued until an acceptable spent slag quality was obtained. When this target was reached, a third lead-tin based metal phase 29 and a third spent slag 28 had been produced, the compositions and amounts of which are given in Table XXII. The third spent slag 28 was poured off and was removed from the process. The third lead-tin based metal composition 29 was transferred to the TBRC which was intended for performing step p) (1200).

TABLE XXII

| Step o) (1100) | Third Pb—Sn based metal phase - 29 22.300 | | Third spent slag 28 45.542 | |
|---|---|---|---|---|
| Mt/chge | Mton | % wt | Mton | % wt |
| Cu | 15.446 | 69.56% | 0.155 | 0.34% |
| Sn | 1.923 | 8.66% | 0.069 | 0.15% |
| Pb | 2.417 | 10.88% | 0.205 | 0.45% |
| Zn | 0.347 | 1.56% | 1.812 | 3.98% |
| Fe | 1.598 | 7.20% | 18.522 | 40.67% |
| Ni | 0.406 | 1.83% | 0.015 | 0.03% |
| Sb | 0.041 | 0.18% | 0.000 | 0.00% |
| Bi | 0.005 | 0.02% | 0.000 | 0.00% |
| As | 0.011 | 0.05% | 0.000 | 0.00% |

Step p) (1200): To the third lead-tin based metal composition 29 were added 5,204 kg of fresh feed 51 along with an amount of sand flux sufficient to obtain the desired effects of phase separation and/or slag fluidity. Subsequently, by partial oxidation, most of the iron and zinc were oxidized from the metal phase into the slag phase. The compositions and amounts of the products from this oxidation step p) (1200) are shown in Table XXIII.

TABLE XXIII

| Step p) (1200) | Third Pb—Sn based metal phase - 29 22.300 | | Fresh Feed 51 5.204 | |
|---|---|---|---|---|
| Mt/chge | Mton | % wt | Mton | % wt |
| Cu | 15.446 | 69.56% | 1.402 | 32.04% |
| Sn | 1.923 | 8.66% | 0.368 | 8.42% |
| Pb | 2.417 | 10.88% | 0.386 | 8.83% |
| Zn | 0.347 | 1.56% | 0.156 | 3.56% |
| Fe | 1.598 | 7.20% | 0.989 | 22.61% |
| Ni | 0.406 | 1.83% | 0.158 | 3.61% |
| Sb | 0.041 | 0.18% | 0.023 | 0.54% |
| Bi | 0.005 | 0.02% | 0.000 | 0.01% |
| As | 0.011 | 0.05% | 0.000 | 0.00% |

When the oxidation of iron and zinc had sufficiently been progressed, a fourth lead-tin based metal composition 21 and a sixth solder refining slag 14 had been produced, the compositions and amounts of which are given in Table XXIV. The sixth solder refining slag 14 was poured off and was added at least partially as stream 14 to the first liquid bath (450) and/or at least partially as stream 53 to the step e) (600) of the next process cycle. The fourth lead-tin based metal composition 21 was transferred to another TBRC to become part of the second liquid bath 550 and for performing the step l) (800) as part of the next process cycle.

TABLE XXIV

| Step p) (1200) | Fourth Pb—Sn based metal phase - 21 20.665 | | Sixth Solder Refining Slag 14 9.124 | |
|---|---|---|---|---|
| Mt/chge | Mton | % wt | Mton | % wt |
| Cu | 16.483 | 79.76% | 0.281 | 3.08% |
| Sn | 1.882 | 9.11% | 0.411 | 4.51% |
| Pb | 1.643 | 7.95% | 1.158 | 12.69% |
| Zn | 0.019 | 0.09% | 0.483 | 5.30% |
| Fe | 0.012 | 0.06% | 2.573 | 28.21% |
| Ni | 0.533 | 2.58% | 0.030 | 0.33% |
| Sb | 0.063 | 0.31% | 0.001 | 0.01% |
| Bi | 0.006 | 0.03% | 0.000 | 0.00% |
| As | 0.011 | 0.05% | 0.000 | 0.00% |

The process steps 100-1200 involving molten metal and/or slag phases are all operated at a temperature in the range of 1100 to 1250° C. Depending on the purpose of the step, its operating temperature may preferably be close to the upper or to the lower end of this temperature range.

The applicants have found that the embodiment of the process as described in this Example may be performed in a limited number of TBRC's. The applicants have been able to perform this process in as few as 8 furnaces, several of them preferably being of the TBRC type. The applicants prefer to perform this process in as few as 6 furnaces, more preferably in only 5 furnaces, even more preferably in only 4 furnaces, yet more preferably in only 3 furnaces.

Having now fully described this invention, it will be appreciated by those skilled in the art that the invention can be performed within a wide range of parameters within what is claimed, without departing from the scope of the invention, as defined by the claims.

The invention claimed is:

1. A process for the production of a crude solder product and a copper product comprising the step of
    a) providing a black copper composition comprising at least 50% wt of copper together with at least 1.0% wt of tin and/or at least 1.0% wt of lead,
the process further comprising the steps of
    (i) refining a first portion of the black copper composition obtained from step a) to obtain a refined copper product together with at least one copper refining slag,
    (ii) recovering a first crude solder metal composition, as a first crude solder product, from the at least one copper refining slag, thereby forming a second solder refining slag in equilibrium with the first crude solder metal composition,
the process further comprises the step of
    f) contacting a second portion of the black copper composition from step a), different from the first portion, with the second solder refining slag thereby forming a second spent slag and a second lead-tin based metal composition, followed by separating the second spent slag from the second lead-tin based metal composition.

2. The process according to claim 1, further comprising the steps of
    (iii) recovering a second crude solder metal composition, different from the first crude solder metal composition, as a second crude solder product, from the at least one copper refining slag, thereby forming a fifth solder refining slag in equilibrium with the second crude solder metal composition, and o) contacting a third portion of the black copper composition obtained from step a), different from the first portion and from the second portion, with the fifth solder refining slag, thereby forming a third spent slag and a third lead-tin based metal composition, followed by separating the third spent slag from the third lead-tin based metal composition.

3. The process according to claim 2, further comprising at least one of the following steps:

VII pre-refining the second crude solder metal composition using silicon metal to produce a pre-refined solder metal composition, VIII cooling at least one of the second crude solder metal composition and the pre-refined solder metal composition, under the condition that step VII is selected as being part of the process, down to a temperature of at most 825° C. to produce a bath containing a first supernatant dross which by gravity becomes floating upon a first liquid molten tuned solder phase, IX adding a compound selected from an alkali metal, an alkaline earth metal, and chemical compounds comprising at least one of an alkali metal and an alkaline earth metal, to at least one material selected from the second crude solder metal composition, the pre-refined solder metal composition, under the condition that step VII is selected as being part of the process, and, under the condition that step VIII is selected as being part of the process, the first liquid molten tuned solder phase to form a bath containing a second supernatant dross which by gravity comes floating on top of a second liquid molten tuned solder phase, X under the condition that step IX is selected as being part of the process, removing the second supernatant dross from the second liquid molten tuned solder phase, thereby forming a second tuned solder, XI under the condition that step VIII is selected as being part of the process, removing the first supernatant dross from the first liquid molten tuned solder phase, thereby forming a first tuned solder, and XII distilling at least one of the first tuned solder, under the condition that step XI is selected as being part of the process, and the second tuned solder, under the condition that step X is selected as being part of the process, wherein lead (Pb) is removed from the solder by evaporation and a distillation overhead product and a distillation bottom product are obtained.

4. The process according to claim 1, wherein step (i) comprises the step of b) partially oxidizing the first portion of the black copper composition, thereby forming a first enriched copper metal phase and a first copper refining slag, followed by separating the first copper refining slag from the first enriched copper metal phase.

5. The process according to claim 4, wherein step (i) further comprises the step of c) partially reducing the first copper refining slag thereby forming a first lead-tin based metal composition and a first spent slag, followed by separating the first spent slag from the first lead-tin based metal composition, the latter forming the basis for a first liquid bath.

6. The process according to claim 5, wherein step (i) further comprises the step of d) partially oxidizing the first liquid bath, thereby forming a first dilute copper metal composition and a first solder refining slag, followed by separating the first solder refining slag from the first dilute copper metal composition.

7. The process according to claim 6, wherein step (ii) further comprises the step of e) partially reducing the first solder refining slag, thereby forming the first crude solder metal composition and the second solder refining slag, followed by separating the second solder refining slag from the first crude solder metal composition.

8. The process according to claim 6, wherein step (i) further comprises the step of h) partially oxidizing the first enriched copper metal phase, thereby forming a second enriched copper metal phase and a second copper refining slag, followed by separating the second copper refining slag from the second enriched copper metal phase.

9. The process according to claim 8, further comprising the following step:

i) at least one of adding at least a part of the second copper refining slag to the first liquid bath and adding at least a part of the second copper refining slag to step d).

10. The process according to claim 8, further comprising the following steps:

j) partially oxidizing second enriched copper metal phase, thereby forming a third enriched copper metal phase and a third copper refining slag, followed by separating the third copper refining slag from the third enriched copper metal phase, k) at least one of adding at least a part of the third copper refining slag to the first dilute copper metal composition, thereby forming a second liquid bath and adding at least a part of the third copper refining slag to step l);

l) Partially oxidizing the second liquid bath, thereby forming a first high-copper metal composition and a third solder refining slag, followed by separating the third solder refining slag from the first high-copper metal composition.

11. The process according to claim 10, further comprising the following step:

m) partially reducing the third solder refining slag, thereby forming a second dilute copper metal composition and a fourth solder refining slag, followed by separating the fourth solder refining slag from the second dilute copper metal composition.

12. The process according to claim 11 further comprising the steps of:

(iii) recovering a second crude solder metal composition, different from the first crude solder metal composition, as a second crude solder product, from the at least one copper refining slag, thereby forming a fifth solder refining slag in equilibrium with the second crude solder metal composition, and n) partially reducing the fourth solder refining slag, thereby forming the second crude solder metal composition and the fifth solder refining slag, followed by separating the second crude solder metal composition from the fifth solder refining slag.

13. The process according to claim 1, wherein the black copper is produced by a smelter step.

14. The process according to claim 1, further comprising at least one of the following steps:

I pre-refining the first crude solder metal composition using silicon metal to produce a pre-refined solder metal composition, II cooling at least one of the first crude solder metal composition, and the pre-refined solder metal composition, under the condition that step I is selected as being part of the process, down to a temperature of at most 825° C. to produce a bath containing a first supernatant dross which by gravity becomes floating upon a first liquid molten tuned solder phase, III adding a compound selected from an alkali metal, an alkaline earth metal, and chemical compounds comprising at least one of an alkali metal and an alkaline earth metal, to at least one material selected from the first crude solder metal composition the pre-refined solder metal composition, under the condition that step I is selected as being part of the process, and, under the condition that step II is selected as being part of the process, the first liquid molten tuned solder phase to form a bath containing a second supernatant dross which by gravity comes floating on top of a second liquid molten tuned solder phase, IV under the condition that step III is selected as being part of the process, removing the second supernatant dross from the second liquid molten tuned solder phase, thereby forming a second tuned solder, V under the condition that step II is selected as being part of the process, removing the first supernatant dross from the first liquid molten tuned solder phase, thereby forming a first tuned solder, and VI distilling at least one of the first tuned solder, under the condition that step V is selected as being part of the process, and the second tuned solder, under the condition that step IV is selected as being part of the process, wherein lead (Pb) is removed from the solder by evaporation and a distillation overhead product and a distillation bottom product are obtained.

\* \* \* \* \*